United States Patent
Shigeta

(10) Patent No.: US 9,571,584 B2
(45) Date of Patent: Feb. 14, 2017

(54) METHOD FOR RESUMING PROCESS AND INFORMATION PROCESSING SYSTEM

(71) Applicant: FUJITSU LIMITED, Kawasaki-shi, Kanagawa (JP)

(72) Inventor: Soichi Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 14/458,382

(22) Filed: Aug. 13, 2014

(65) Prior Publication Data
US 2015/0100960 A1  Apr. 9, 2015

(30) Foreign Application Priority Data
Oct. 8, 2013  (JP) ................. 2013-211348

(51) Int. Cl.
*G06F 9/48* (2006.01)
*G06F 9/50* (2006.01)
*H04L 29/08* (2006.01)

(52) U.S. Cl.
CPC ............. *H04L 67/14* (2013.01); *G06F 9/4856* (2013.01); *G06F 9/5088* (2013.01)

(58) Field of Classification Search
None
See application file for complete search history.

(56) References Cited

U.S. PATENT DOCUMENTS

| | | | |
|---|---|---|---|
| 2006/0015875 A1 | 1/2006 | Ishihara et al. | |
| 2014/0006740 A1* | 1/2014 | Tokusho | G06F 12/02 711/165 |

FOREIGN PATENT DOCUMENTS

JP  2007-179100  7/2007
WO  WO 2004/086246 A1  10/2004

OTHER PUBLICATIONS

Breitgand et al. Cost-Aware Live Migration of Services in the Cloud. [online] (2010). ISF., pp. 1-6. Retrieved From the Internet <http://static.usenix.org/events/hotice11/tech/full_papers/Breitgand.pdf>.*
Stellner et al. CoCheck: Checkpointing and Process Migration for MPI. [online] (1996). IEEE., pp. 1-6. Retrieved From the Internet <http://citeseerx.ist.psu.edu/viewdoc/download?doi=10.1.1.92.6561&rep=rep1&type=pdf>.*
Wang et al. Proactive Process-Level Live Migration in HPC Environments. [online] (2008). ACM., pp. 1-12. Retrieved From the Internet <http://moss.csc.ncsu.edu/~mueller/ftp/pub/mueller/papers/sc08.pdf>.*

* cited by examiner

*Primary Examiner* — Emerson Puente
*Assistant Examiner* — Jonathan R Labud
(74) *Attorney, Agent, or Firm* — Staas & Halsey LLP

(57) ABSTRACT

One of first and second computers computes a first time taken to transfer first data, which is stored by an application process that is executed and suspended by the second computer and to be executed by the first computer, from the second computer to the first computer. The one computes a second time on basis of a transfer time and an elapsed execution time. The transfer time is taken to transfer second data from a storage area to the first computer. The second data is used to execute the process from beginning. The elapsed execution time is taken to execute the process up to a suspend point. The one determines to resume the process from the suspend point when the first time is shorter than the second time, and re-execute the process from the beginning when the second time is shorter than the first time.

6 Claims, 24 Drawing Sheets

FIG. 3

| VM HOST ID | Pod ID | IP ADDRESS | STATUS | VM GUEST ALLOCATION | ACCESSIBLE VIRTUAL STORAGE ID |
|---|---|---|---|---|---|
| Host_001 | A | 192.168.1.10 | RUNNING | 5/20 | VS_001 |
| Host_002 | A | 192.168.1.11 | RUNNING | 16/20 | VS_001 |
| Host_101 | B | 192.168.2.2 | UNDER MAINTENANCE | 0/12 | VS_101 |
| Host_102 | B | 192.168.2.3 | RUNNING | 8/12 | VS_101 |

FIG. 4

| VM GUEST ID | VM HOST ID | IP ADDRESS | STATUS | ALLOCATED VIRTUAL DISK ID |
|---|---|---|---|---|
| Guest_01 | Host_001 | 192.168.10.20 | STOPPED | VDISK_001, VDISK_002 |
| Guest_02 | Host_002 | 192.168.11.30 | RUNNING | VDISK_030 |
| Guest_501 | Host_102 | 192.168.30.2 | RUNNING | VDISK_101, VDISK_102 |
| Guest_502 | Host_102 | 192.168.40.2 | STOPPED | VDISK_211, VDISK_301 |

FIG. 5

| STORAGE ID | IP ADDRESS (ADMINISTRATION) | IP ADDRESS (ACCESS) | STATUS | USAGE |
|---|---|---|---|---|
| S_A01 | 192.168.100.2 | 192.168.1.131 | RUNNING | 300GB/2TB |
| S_A02 | 192.168.100.3 | 192.168.1.132 | RUNNING | 450GB/2TB |
| S_B01 | 192.168.200.2 | 192.168.2.131 | UNDER MAINTENANCE | 768GB/4TB |
| S_B02 | 192.168.200.3 | 192.168.2.132 | RUNNING | 1.2TB/4TB |

FIG. 7

| VIRTUAL DISK ID | VIRTUAL STORAGE ID | CAPACITY |
| --- | --- | --- |
| VDISK_001 | VS_001 | 30GB |
| VDISK_002 | VS_001 | 100GB |
| VDISK_030 | VS_001 | 10GB |
| VDISK_101 | VS_002 | 50GB |
| VDISK_102 | VS_002 | 200GB |

FIG. 8

| Pod \ Pod | A | B | C | ... |
|---|---|---|---|---|
| A | - | 200Mbps | 100Mbps | ... |
| B | 200Mbps | - | 500Mbps | ... |
| C | 100Mbps | 500Mbps | - | ... |
| ... | ... | ... | ... | - |

| APPLICATION NAME | RE-EXECUTABLE | INPUT DATA SIZE | OUTPUT DATA SIZE |
|---|---|---|---|
| APP-A | TRUE | 1024.1MB | 6MB |
| APP-B | FALSE | 0MB | 500MB |

METHOD FOR RESUMING PROCESS AND INFORMATION PROCESSING SYSTEM

CROSS-REFERENCE TO RELATED APPLICATION

This application is based upon and claims the benefit of priority of the prior Japanese Patent Application No. 2013-211348, filed on Oct. 8, 2013, the entire contents of which are incorporated herein by reference.

FIELD

The embodiments discussed herein are related to a method for resuming a process and an information processing system.

BACKGROUND

There exists technology that uses physical resources of a physical server to run a virtual machine (VM). Such a physical server may be referred to as a VM host, while such a virtual machine may be referred to as a VM guest in contraposition with the VM host, for example.

There exists migration technology that moves a VM guest running on a VM host to another VM host. For example, in the case of stopping or rebooting a VM host for maintenance or another reason, a VM guest running on the VM host targeted for maintenance is moved to a different VM host, and the task executed by the VM guest is made to continue.

Related techniques are disclosed in, for example, Japanese Laid-open Patent Publication No. 2007-179100 and International Publication Pamphlet No. WO 2004/086246.

However, with the above technology, in some cases it takes time for the VM guest to resume a process after migration.

For example, after starting migration, a management device suspends a process of the VM guest to be migrated, and transfers data used by the VM guest for that process from the source VM host to the destination VM host. Even if migration has completed, the VM guest may be unable to resume the process until completion of the data transfer. In the case of transferring a large amount of data, it may take time until the process is resumed.

The VM guest may restart the suspended process all over from the beginning after migration is completed. However, depending on factors such as the data transfer rate and the remaining processing load, waiting for the data transfer to complete and resuming the process rather than restarting all over from the beginning may enable earlier completion of the overall process in some cases.

SUMMARY

According to an aspect of the present invention, provided is a method for resuming a process. In the method, one of a first computer and a second computer different from the first computer computes a first time taken to transfer first data from the second computer to the first computer. The first data is stored by an application process before the application process is suspended. The application process is executed and suspended by the second computer and to be executed by the first computer. The one computes a second time on basis of a transfer time and an elapsed execution time. The transfer time is a time taken to transfer second data from a storage area in which the second data is stored to the first computer. The second data is used to execute the application process from beginning of the application process. The elapsed execution time is a time taken to execute the application process from the beginning up to a suspend point at which the application process is suspended. The one determines, when the first time is shorter than the second time, to resume the application process on the first computer from the suspend point. The one determines, when the second time is shorter than the first time, to re-execute the application process on the first computer from the beginning.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a VM host management table;

FIG. 4 is a diagram illustrating an example of information stored in a VM guest management table;

FIG. 5 is a diagram illustrating an example of information stored in a physical storage management table;

FIG. 7 is a diagram illustrating an example of information stored in a virtual disk management table;

FIG. 8 is a diagram illustrating an example of information stored in a bandwidth management table;

FIG. 12 is a diagram illustrating an example of information stored in an application properties table;

DESCRIPTION OF EMBODIMENTS

Hereinafter, embodiments of a method for resuming a process and an information processing system will be described in detail with reference to the drawings. However, the configuration is not limited to these embodiments.

First Embodiment

Figure 1:
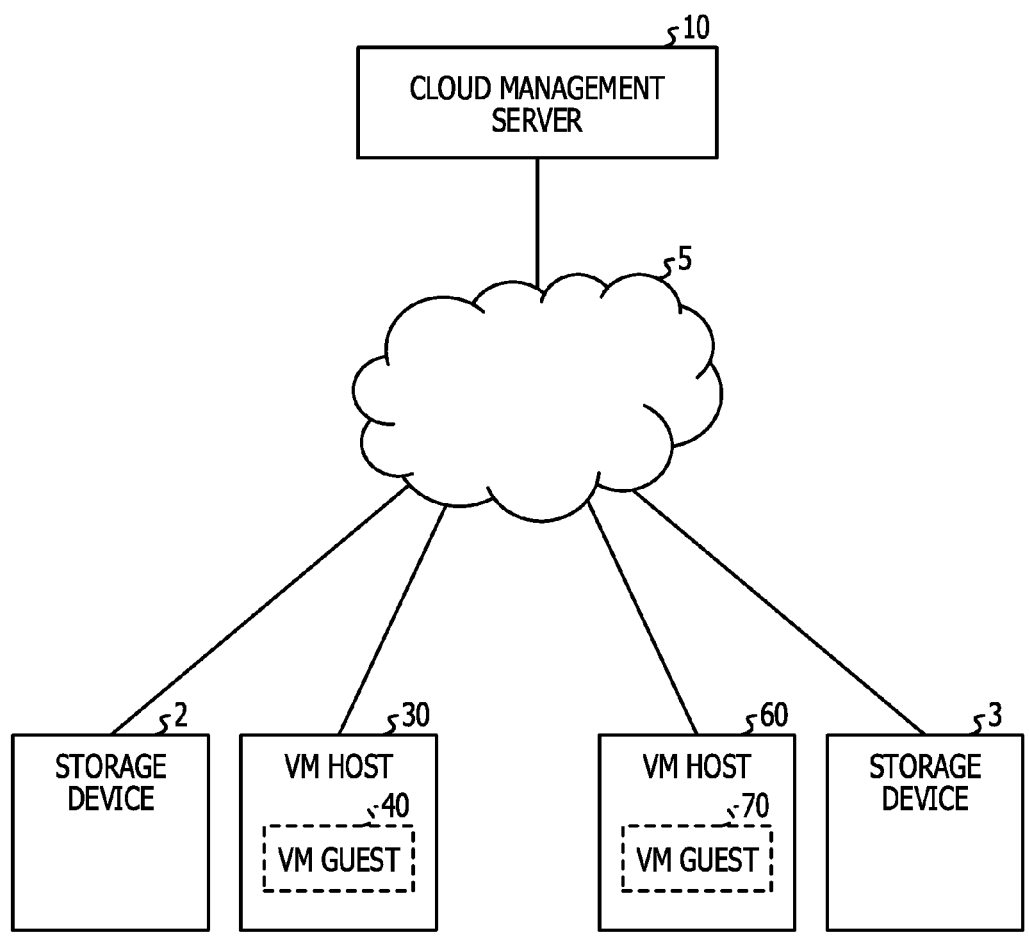
FIG. 1 is a diagram illustrating an exemplary configuration of a system according to a first embodiment.

FIG. 1 is a diagram illustrating an exemplary configuration of a system according to a first embodiment. As illustrated in FIG. 1, the system includes a storage device 2, a storage device 3, a cloud management server 10, a VM host 30, and a VM host 60. Each VM host runs a virtual machine, that is, a VM guest. These devices are connected with one another via a network 5.

The system illustrated in FIG. 1 is a system provided by a cloud business operator that provides a cloud system. Specifically, the cloud business operator provides an environment for operating a VM guest desired by a user of the cloud system.

A cloud user uses the environment provided by the cloud business operator via the network 5. Specifically, if the cloud user uses a client device to transmit VM guest provisioning request to the cloud management server 10, the cloud management server 10 uses the respective devices illustrated in FIG. 1 to provision a VM guest in the system. The cloud user uses the provisioned VM guest via the network 5.

The respective devices used by the cloud business operator to provision a VM guest will now be described. The cloud management server 10 is a server device that manages the respective storage devices, VM hosts, VM guests, and the like in the system. The cloud management server 10 is a server device that performs the creation, deletion, and migration of a VM guest.

The storage device 2 is a device for storing therein information such as data used by the VM host 30 and each VM guest running on the VM host 30, and is accessible by the VM host 30 and the cloud management server 10.

The storage device 3 is a device for storing therein information such as data used by the VM host 60 and each VM guest running on the VM host 60, and is accessible by the VM host 60 and the cloud management server 10.

Although this example describes a case in which each VM host and each storage device are realized in separate housings, the configuration is not limited thereto. For example, each VM host may also include a storage device internally. Also, a storage device may be shared among respective VM hosts.

The VM host 30 is a physical server that runs a VM guest using physical resources such as a processor, a memory, and hardware. A VM guest 40 running on the VM host 30 accesses the storage device 2 to store or retrieve data.

Similarly, the VM host 60 is a physical server that runs a VM guest using physical resources such as a processor, a memory, and hardware. A VM guest 70 running on the VM host 60 accesses the storage device 3 to store or retrieve data.

In such a system, a VM guest may be migrated in some cases, depending on the circumstances of the cloud business operator or the like. Specifically, in the case of stopping or rebooting a VM host to apply a patch to the VM host or replace a component due to a physical failure in the VM host, a VM guest is migrated to another VM host, and the task of the VM guest is made to continue.

If a migration of a VM guest occurs, the VM host suspends and migrates a process of the VM guest. In this case, the time to resume the process after migration may be shortened.

Specifically, the VM guest running on the VM host computes a first time which is a first transfer time taken if data stored in a storage area, which is used before the migration from a second VM host to a first VM host, is transferred from the second VM host to the first VM host. Also, the VM guest computes a second time on the basis of a second transfer time and an elapsed execution time. The second transfer time is a time taken if data used for executing a process, which is suspended due to migration, from the beginning is transferred from the second VM host to the first VM host. The elapsed execution time is a time taken to execute the process up until the suspension. If the first time is shorter than the second time, the VM guest resumes the suspended process from the suspend point. If the second time is shorter than the first time, the VM guest executes the suspended process from the beginning.

Thus, the time to transfer partial data and resume a process suspended by migration, and the time taken to restart the process from the beginning and reach the suspend point on the migration destination are computed and the shorter time is selected. For this reason, the process may be resumed earlier.

Figure 2:
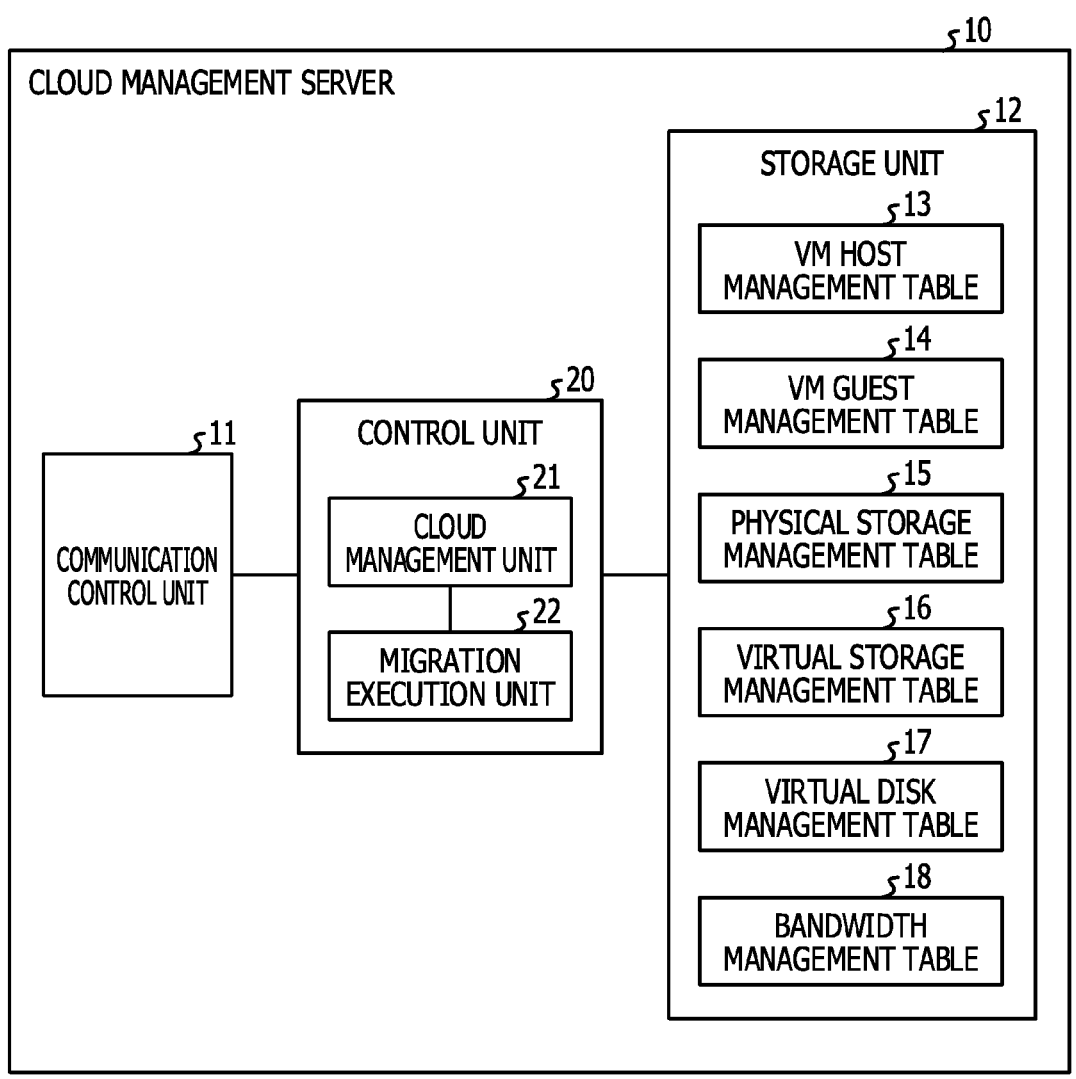
FIG. 2 is a diagram illustrating a functional configuration of a cloud management server according to a first embodiment.

FIG. 2 is a diagram illustrating a functional configuration of a cloud management server according to the first embodiment. As illustrated in FIG. 2, the cloud management server 10 includes a communication control unit 11, a storage unit 12, and a control unit 20.

The communication control unit 11 is a processing unit that controls communication with other devices, and may be a network interface card, for example. For example, the communication control unit 11 receives a VM guest provisioning request from a user's client device, and receives various requests from a cloud administrator terminal, VM host, or VM guest. In addition, the communication control unit 11 transmits a VM guest provisioning result to the user's client device, and transmits various responses to the cloud administrator terminal, VM host, or VM guest.

The storage unit 12 is a storage device such as a memory or a hard disk drive, and stores therein information such as a program executed by the control unit 20. The storage unit 12 stores therein a VM host management table 13, a VM guest management table 14, a physical storage management table 15, a virtual storage management table 16, a virtual disk management table 17, and a bandwidth management table 18.

The VM host management table 13 is a table for managing information related to physical servers, that is, VM hosts, in the cloud system. FIG. 3 is a diagram illustrating an example of information stored in a VM host management table. As illustrated in FIG. 3, the VM host management table 13 stores therein a "VM Host Identifier (ID)", a "Pod ID", an "Internet Protocol (IP) Address", a "Status", a "VM Guest Allocation", and an "Accessible Virtual Storage ID" in association with one another.

The "VM Host ID" stored herein is an identifier for identifying a VM host, and may be a host name, for example.

The "Pod ID" is an identifier for identifying a cloud group to which the VM host belongs. The "IP Address" is an IP address set for the VM host. The "Status" is information indicating the running conditions of the VM host, and is set to "Running" if the VM host is running, "Under Maintenance" if the VM host is under maintenance, and "Stopped" if the VM host has stopped.

The "VM Guest Allocation" is information indicating a maximum number of VM guests that may run on the VM host, and of those, how many VM guests are currently running. The "Accessible Virtual Storage ID" is an identifier for identifying virtual storage that the VM host is able to access. The virtual storage herein refers to a virtualized storage area that is logically constructed using one or more physical storage areas, for example.

In the case of FIG. 3, a VM host with a VM host ID "Host_001" belongs to a cloud group "A". "192.168.1.10" is set as the IP address of the VM host. The VM host is "Running". Up to "20" VMs may run on the VM host and "5" VMs are currently running. The VM host is able to access virtual storage "VS_001".

As another example, a VM host with a VM host ID "Host_101" belongs to a cloud group "B", and "192.168.2.2" is set as the IP address of the VM host. The VM host is "Under Maintenance". Up to "12" VMs may run on the VM host and no VM is currently running. The VM host is able to access virtual storage "VS_101".

The VM guest management table 14 is a table for storing therein information related to VM guests running on VM hosts. FIG. 4 is a diagram illustrating an example of information stored in a VM guest management table. As illustrated in FIG. 4, the VM guest management table 14 stores therein a "VM Guest ID", a "VM Host ID", an "IP Address", a "Status", and an "Allocated Virtual Disk ID" in association with one another.

The "VM Guest ID" stored herein is an identifier for identifying a VM guest. The "VM Host ID" is an identifier for identifying the VM host running the VM guest, and may be a host name, for example. The "IP Address" is an IP address set for the VM guest. The "Status" is information indicating the running conditions of the VM guest, and is set to "Running" if the VM guest is running, "Stopped" if the VM guest has stopped, and "Migrating" if the VM guest is being migrated. The "Allocated Virtual Disk ID" is an identifier for identifying a virtual disk allocated to the VM guest, and is information about a virtual disk accessible by the VM guest.

For example, in the case of FIG. 4, a VM guest with a VM guest ID "Guest_01" is running on a VM host with a VM host ID "Host_001". "192.168.10.20" is set as the IP address of the VM guest. The VM guest is currently "Stopped". The VM guest is able to access a virtual disk identified by "VDISK_001" and a virtual disk identified by "VDISK_002", which indicates that the VM guest stores data on these virtual disks.

A VM guest with a VM guest ID "Guest_02" is running on a VM host with a VM host ID "Host_002". "192.168.11.30" is set as the IP address of the VM guest. The VM guest is currently "Running". The VM guest is able to access a virtual disk identified by "VDISK_030", which indicates that the VM guest stores data on this virtual disk.

The physical storage management table 15 is a table for storing therein information related to physical storage in the cloud system. FIG. 5 is a diagram illustrating an example of information stored in a physical storage management table. As illustrated in FIG. 5, the physical storage management table 15 stores therein a "Storage ID", an "IP Address (Administration)", an "IP Address (Access)", a "Status", and a "Usage" in association with one another.

The "Storage ID" stored herein is an identifier for identifying a storage device. The "IP Address (Administration)" is an IP address used for maintenance or the like of the storage device. An administrator terminal accesses this IP address to conduct maintenance management. The "IP Address (Access)" is an IP address accessed by a VM host or VM guest. By accessing this IP address, a user device is able to read and write data.

The "Status" is information indicating the running conditions of the storage device, and is set to "Running" if the storage device is running, "Under Maintenance" if the storage device is under maintenance, and "Stopped" if the storage device has stopped. The "Usage" is information indicating the used capacity and maximum capacity of the physical storage device.

In the case of FIG. 5, storage with a storage ID "S_A01" has "192.168.100.2" set as the administration IP address and "192.168.1.131" set as the access IP address. The storage is currently "Running". The storage has a maximum capacity of 2 TB, of which 300 GB is currently used.

Figure 6:
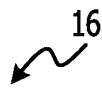
FIG. 6 is a diagram illustrating an example of information stored in a virtual storage management table.

The virtual storage management table 16 is a table for storing therein information related to virtual storage provided using physical storage. FIG. 6 is a diagram illustrating an example of information stored in a virtual storage management table. As illustrated in FIG. 6, the virtual storage management table 16 stores therein a "Virtual Storage ID", a "Physical Storage ID", and a "Usage" in association with one another.

The "Virtual Storage ID" stored herein is an identifier for identifying virtual storage. The "Physical Storage ID" is an identifier for identifying physical storage that provides the virtual storage. The "Usage" is information indicating the used capacity and maximum capacity of the virtual storage device.

In the case of FIG. 6, virtual storage with a virtual storage ID "VS_001" is provided by physical storage with a physical storage ID "S_A01" and physical storage with a physical storage ID "S_A02". The maximum capacity of the virtual storage is 4 TB, of which 750 GB is currently used.

The virtual disk management table 17 is a table for managing information related to virtual disks accessible by VM guests. The virtual disk refers to a logical storage area provided by virtual storage, for example. FIG. 7 is a diagram illustrating an example of information stored in a virtual disk management table. As illustrated in FIG. 7, the virtual disk management table 17 stores therein a "Virtual Disk ID", a "Virtual Storage ID", and a "Capacity" in association with one another.

The "Virtual Disk ID" stored herein is an identifier for identifying a virtual disk. The "Virtual Storage ID" is an identifier for identifying virtual storage that holds the virtual disk. The "Capacity" is the storage capacity of the virtual disk.

In the case of FIG. 7, a virtual disk with a virtual disk ID "VDISK_030" exists in virtual storage with a virtual storage ID "VS_001". The virtual disk has an allocated capacity of 10 GB.

The bandwidth management table 18 is a table for managing bandwidth in the cloud. FIG. 8 is a diagram illustrating an example of information stored in a bandwidth management table. As illustrated in FIG. 8, the bandwidth management table 18 stores therein bandwidths between respective pods. For example, FIG. 8 indicates that the link between a group with a pod ID "A" and a group with a pod ID "B" is 200 Mbps. Similarly, FIG. 8 indicates that the link between the group with the pod ID "A" and a group with a pod ID "C" is 100 Mbps, and that the link between the group with the pod ID "B" and the group with the pod ID "C" is 500 Mbps.

The control unit 20 is an electronic circuit such as a processor, and is a processing unit that controls overall processing in the cloud management server 10. The control unit 20 includes a cloud management unit 21 and a migration execution unit 22. For example, the cloud management unit 21 and the migration execution unit 22 are examples of processes executed by the control unit 20, or examples of electronic circuits included in the processor.

The cloud management unit 21 is a processing unit that manages the cloud system illustrated in FIG. 1. For example, the cloud management unit 21 receives information about a VM host, VM guest, physical storage, virtual storage, virtual disk, bandwidth, or the like from an administrator, and updates the relevant table. In addition, the cloud management unit 21 monitors the status of VM hosts and VM guests, as well as the usage of respective storage areas and disks, and updates the relevant tables.

The migration execution unit 22 is a processing unit that executes migration of a VM guest. Specifically, in the case of receiving a migration instruction from an administrator, or detecting that a failure or the like has occurred in a VM host, the migration execution unit 22 migrates a VM guest running on the relevant VM host to another VM host.

Note that since the migration is similar to typical migration, detailed description will be omitted herein. For example, the migration execution unit 22 notifies the source VM host to stop the process of the relevant VM guest, and notifies the destination VM host that a migration will occur. The migration execution unit 22 copies information about the relevant VM guest, such as information in a memory as well as processor-related information such as registers, from the source VM host to the destination VM host.

Figure 9:
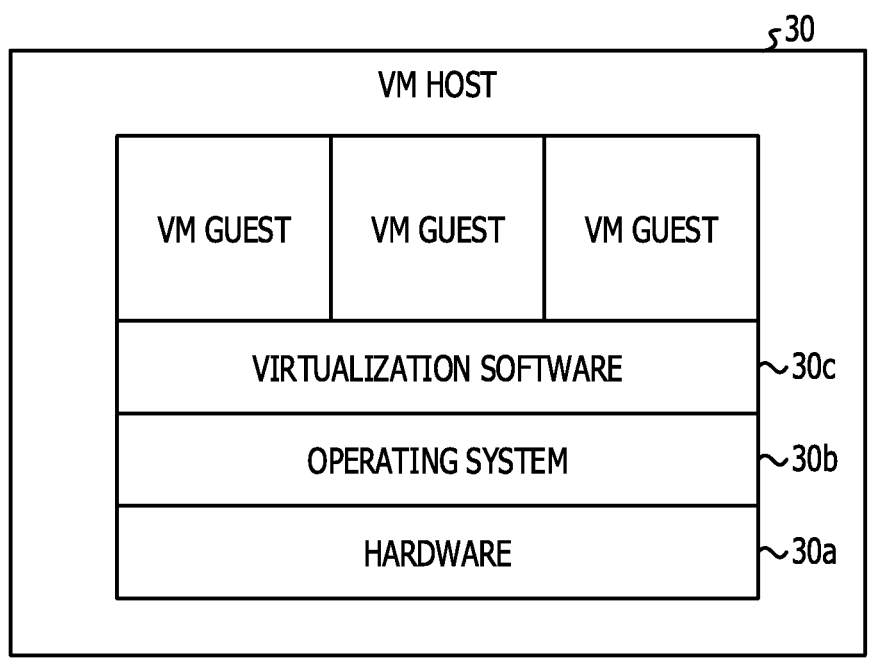
FIG. 9 is a diagram illustrating an example of a hierarchical structure of a VM host.

FIG. 9 is a diagram illustrating an example of a hierarchical structure of a VM host. Note that the following describes the case of running VMs on a single VM host as an example. Also, the following description takes the case of the VM host 30 as an example.

The VM host 30 is a typical physical server, and includes components such as hardware, a processor, and a memory. Specifically, as illustrated in FIG. 9, the VM host 30 runs an operating system 30b on hardware 30a, and uses the operating system 30b to run virtualization software 30c such as a hypervisor and provide a virtual environment. The virtualization software 30c runs multiple VM guests. Note that the hierarchical structure illustrated herein is an exemplification of a case implemented using one example of virtualization technology, but the configuration is not limited thereto, and another typical virtualization technology may be used.

Figure 10:
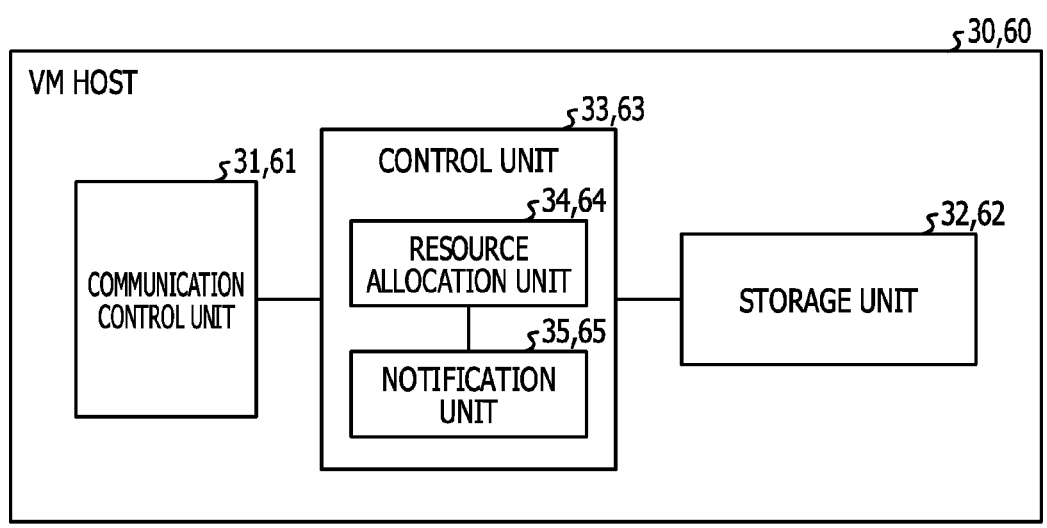
FIG. 10 is a diagram illustrating a functional configuration of a VM host according to a first embodiment.

FIG. 10 is a diagram illustrating a functional configuration of a VM host according to the first embodiment. Note that since the VM host 30 and the VM host 60 have a similar configuration, the description herein will take the VM host 30 as an example. As illustrated in FIG. 10, the VM host 30 includes a communication control unit 31, a storage unit 32, and a control unit 33. The control unit 33 includes a resource allocation unit 34 and a notification unit 35.

The VM host 60 includes a communication control unit 61 that executes a process similar to that of the communication control unit 31, a storage unit 62 for storing therein information similar to that of the storage unit 32, and a control unit 63 that executes a process similar to that of the control unit 33. The control unit 63 includes a resource allocation unit 64 that executes a process similar to that of the resource allocation unit 34, and a notification unit 65 that executes a process similar to that of the notification unit 35.

The communication control unit 31 is a processing unit that controls communication with other devices, and may be a network interface card, for example. For example, the communication control unit 31 receives various requests, such as a migration instruction from the cloud management server 10. In the case in which the VM host 30 is the destination VM host, the communication control unit 31 receives, from the source VM host, information related to the VM guest to be migrated and information to be stored on a virtual disk. In the case in which the VM host 30 is the source VM host, the communication control unit 31 transmits, to the destination VM host, information related to the VM guest to be migrated and information to be stored on a virtual disk.

The storage unit 32 is a storage device such as a memory or a hard disk drive. The storage unit 32 stores therein information such as various programs executed by the control unit 33, and various data.

The control unit 33 is an electronic circuit such as a processor. The resource allocation unit 34 and the notification unit 35 are examples of processes executed by the processor, or examples of electronic circuits included in the processor.

The resource allocation unit 34 is a processing unit that controls the allocation of physical resources to a VM guest. Specifically, the resource allocation unit 34 allocates hardware such as a memory, a processor, and a communication interface to a VM guest, in order to run the VM guest. If a VM guest stops, the resource allocation unit 34 ends the allocation of the hardware allocated to that VM guest, and frees up the allocated resources.

For example, the resource allocation unit 34 allocates a given processing capability of the processor included in the VM host 30 as a processor to be used by a VM. Thus, the resource allocation unit 34 allocates a virtual processor to a VM guest. Also, the resource allocation unit 34 allocates a given area of the memory included in the VM host 30 as a memory to be used by the VM. Thus, the resource allocation unit 34 allocates a virtual memory to the VM guest.

The notification unit 35 is a processing unit that notifies a VM guest of information related to migration. For example, the notification unit 35 informs a VM guest that has been migrated to the VM host 30 that a migration has executed and completed. Also, the notification unit 35 informs a VM guest to be migrated from the VM host 30 that a migration will be initiated.

Figure 11:
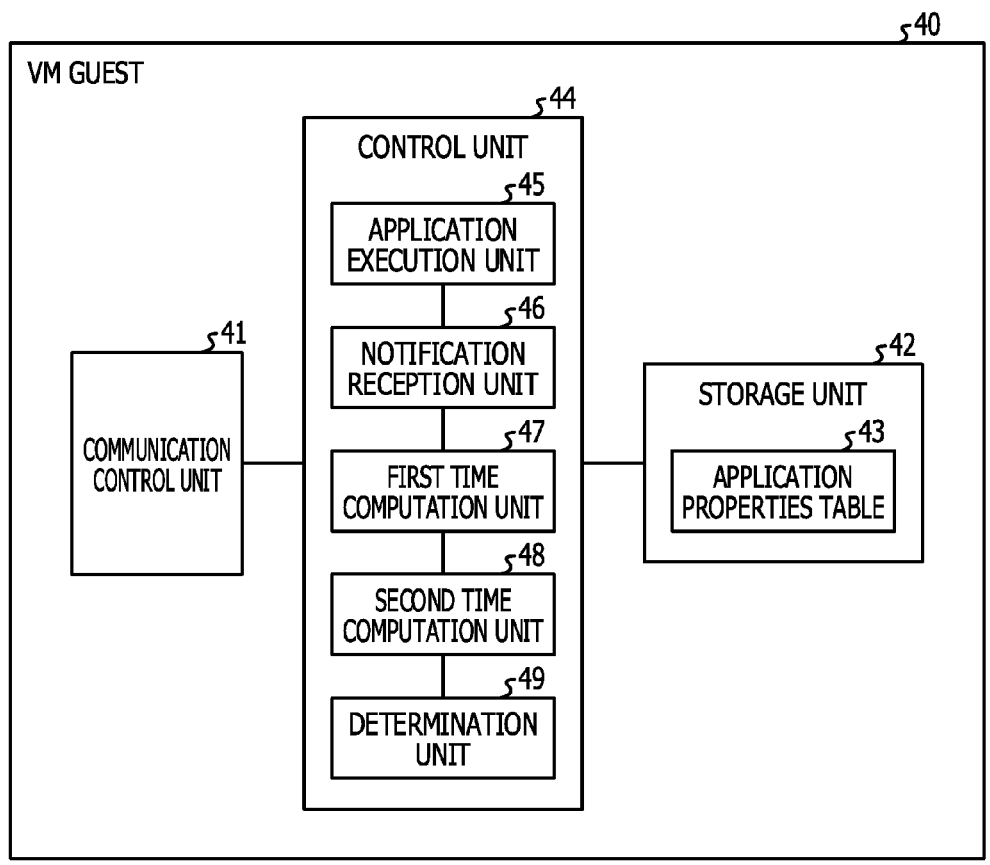
FIG. 11 is a diagram illustrating a functional configuration of a VM guest according to a first embodiment.

FIG. 11 is a diagram illustrating a functional configuration of a VM guest according to the first embodiment. Note that since the respective VM guests have a similar configuration, the description herein will take the VM guest 40 as an example. As illustrated in FIG. 11, the VM guest 40 includes a communication control unit 41, a storage unit 42, and a control unit 44.

The communication control unit 41 is an interface that controls communication with another device, and is a virtual interface constructed using the physical interface of the VM host. For example, the communication control unit 41 receives information such as the initiation and completion of a migration from the VM host. Also, the communication control unit 41 receives various data and instructions from another VM guest, a user's client device, or the like.

The storage unit 42 is a virtual storage device constructed using the memory or hard disk drive of the VM host, and is a virtual memory or the like, for example. The storage unit 42 stores therein a program executed by the control unit 44, and also stores therein an application properties table 43.

The application properties table 43 is a table for storing therein information related to application processes executed by the VM guest 40. FIG. 12 is a diagram illustrating an example of information stored in an application properties table. As illustrated in FIG. 12, the application properties table 43 stores therein an "Application Name", "Re-executable", an "Input Data Size", and an "Output Data Size" in association with one another. Note that the information stored herein is an example, and additional information, such as a storage location of a program, for example, may also be stored.

The "Application Name" stored herein is an identifier for identifying an application process. "Re-executable" is information indicating whether or not the application process is able to be rewound and executed, that is, whether or not the process is able to be re-executed during processing. The "Input Data Size" is the size of input data used to execute the application process. For example, in the case of an application process of a batch job, the input data size equals the size of the processing program plus the size of the input data. The "Output Data Size" is the size of data output by the application process.

In the case of an application process of a batch job, for example, the input data size equals the processing program (1 KB)+input data (1 GB)=1024.1 MB, while the output data size equals 0 MB. In the case of an application process that conducts a checkpoint, for example, the input data size equals 0 MB, while the output data size equals the data size of the partial result saved at the checkpoint.

In the example of FIG. 12, an application process with an application name "APP-A" has setting of "True" for "Re-executable", indicating that the application process may be re-executed during processing. In contrast, an application process with an application name "APP-B" has setting of "False" for "Re-executable", indicating that re-execution of the application process during processing is not preferable.

The control unit 44 is a virtual processor or the like, constructed using the processor of the VM host. The control unit 44 includes an application execution unit 45, a notification reception unit 46, a first time computation unit 47, a second time computation unit 48, and a determination unit 49. Note that the respective processing units are examples of processes executed by the control unit 44.

The application execution unit 45 is a processing unit that executes a desired application process. For example, the application execution unit 45 retrieves the program of an application process specified by a user or the like from the storage unit 42 and executes the retrieved program.

If a migration is initiated, the application execution unit 45 suspends an application process currently being executed. Afterwards, the application execution unit 45 resumes the suspended application process in a manner indicated in a notification from the determination unit 49. For example, the application execution unit 45 may resume an application process from the suspend point, or discard the processing up to the suspension, and restart the application process from the beginning.

The notification reception unit 46 is a processing unit that receives notifications related to the initiation and completion of migrations. In the case of receiving each notification, the notification reception unit 46 reports the notification content to units such as the first time computation unit 47 and the second time computation unit 48.

For example, before migration of the VM guest 40 is executed, the notification reception unit 46 is notified by the source VM host that the VM guest 40 is to be migrated, and that migration will be initiated. Also, after migration of the VM guest 40 has completed, the notification reception unit 46 is notified by the destination VM host that the migration has completed.

The first time computation unit 47 is a processing unit that computes a first time which is a first transfer time taken if data stored in a storage area, which is used by the migrated VM guest before the migration, is transferred from the source VM host to the destination VM host. Specifically, if notified by the notification reception unit 46 of the initiation or completion of a migration, the first time computation unit 47 computes the data transfer time taken to transfer the data stored in the virtual disk allocated to the VM guest to be migrated from the source to the destination.

For example, suppose that "Tdata" is the data transfer time, "Sjob" is the input data size (processing program+input data), "Sout" is the output data size, and "Bww" is the available bandwidth between the migration source and destination. In this case, the first time computation unit 47 computes "Tdata=(Sjob+Sout)/Bww" as the first time. The first time computation unit 47 outputs the computation result to the determination unit 49.

The second time computation unit 48 is a processing unit that computes a second time on the basis of a second transfer time and an elapsed execution time. The second transfer time is a time taken if data used for executing a process, which is suspended due to migration of the VM guest, from the beginning is transferred from the migration source to the migration destination. The elapsed execution time is a time taken by the process executed up until the suspension.

Specifically, if notified by the notification reception unit 46 of the initiation or completion of a migration, the second time computation unit 48 computes the job reacquisition time taken to acquire the program of the application process (or the job) from the migration source. In addition, the second time computation unit 48 computes the elapsed execution time taken to reach the suspend point for the case of restarting the application process from the beginning on the migration destination. After that, the second time computation unit 48 adds together the job reacquisition time and the elapsed execution time to compute the second time.

For example, suppose that "Tget" is the job reacquisition time, "Sjob" is the input data size (processing program+input data), and "Bww" is the available bandwidth between the migration source and destination. Also suppose that "Texe" is the elapsed execution time taken to reach the suspend point of the job. Note that "Texe" is a so-called central processing unit (CPU) time, and may be acquired by application monitoring or from a log, for example.

In this case, the second time computation unit 48 computes "Tget=Sjob/Bww", computes "Tget+Texe" as the second time, and outputs the computation result to the determination unit 49. Note that if the cloud system illustrated in FIG. 1 is a master/worker system, the available bandwidth "Bmw" between the master server and the migration destination is used instead of Bww.

A master/worker system refers to an exemplary system configured so that a physical server called the master manages, in an integrated fashion, application processes (or jobs) that are executed by VM guests and the like. That is, each VM guest retrieves and executes a job from the master server. For this reason, a migrated VM guest retrieves and executes a job from the master server rather than the source VM host.

The determination unit 49 is a processing unit that determines to resume the suspended job from the suspend point if the first time is shorter than the second time, and determines to execute the suspended job from the beginning if the second time is shorter than the first time.

Described in terms of the above example, in the case of "Tdata<(Tget+Texe)", the determination unit 49 determines to resume a job suspended during migration from the suspend point, and notifies the application execution unit 45 of this determination. On the other hand, in the case of "Tdata>(Tget+Texe)", the determination unit 49 determines to restart a job suspended during migration from the beginning, and notifies the application execution unit 45 of this determination. In the case of "Tdata=(Tget+Texe)", the determination unit 49 may arbitrarily determine which method to use to execute a job.

Figure 13:
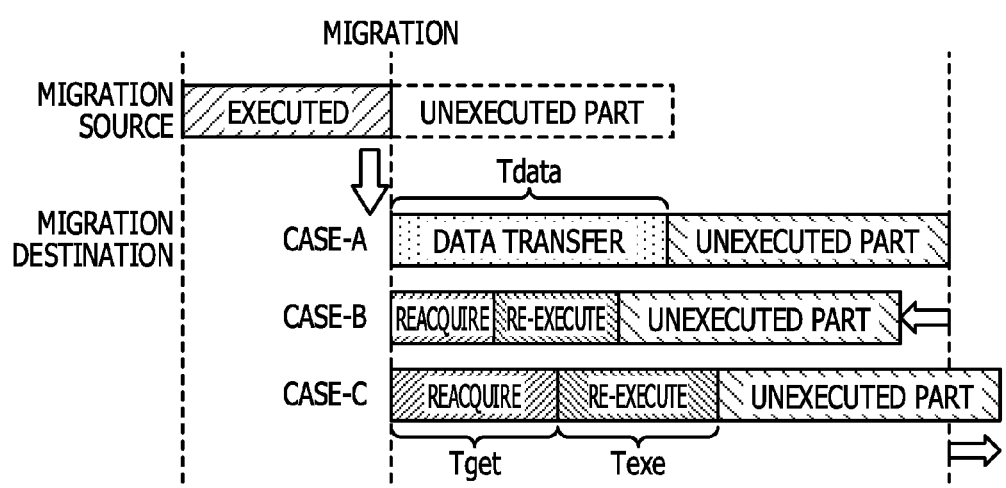
FIG. 13 is a diagram for explaining a resuming method determination.

The resuming method determination will now be specifically described with reference to FIG. 13. FIG. 13 is a diagram for explaining a resuming method determination. As illustrated in FIG. 13, the determination unit 49 executes, on the migration destination, a comparison between "the data transfer time (Tdata)" and "the job reacquisition time (Tget)+the time (Texe) taken to re-execute a job part executed on the migration source". CASE-A in FIG. 13 indicates the time elapsed in the case of directly continuing a job suspended during migration.

As indicated by CASE-B in FIG. 13, if (Tget+Texe) is shorter than Tdata, executing the suspended job from the beginning enables the job to be resumed earlier than CASE-A in FIG. 13. If this condition is satisfied, the determination unit 49 determines to re-execute the job from the beginning, and causes the job to be restarted without waiting for the data transfer. As a result, the unexecuted part may be started earlier, and overall job may be finished earlier. In other words, the overall processing of the application process may be completed earlier.

As indicated by CASE-C in FIG. 13, if (Tget+Texe) is longer than Tdata, re-executing the job from the beginning would make the timing of starting the unexecuted part later than in CASE-A of FIG. 13. In other words, resuming the suspended job from the suspend point enables the job to start the unexecuted part earlier. If this condition is satisfied, the determination unit 49 waits for the data transfer, and causes the job to be resumed from the suspend point. As a result, the unexecuted part may be started earlier, and overall job may be finished earlier.

Next, the flow of processes executed by the respective devices will be described. Herein, an overall system processing sequence, a process by a cloud management server, a process by a source VM host, a process by a destination VM host, and a process by a VM guest will be described. Note that the following describes an example of migrating the VM guest 40 running on the VM host 30 to the VM host 60.

Figure 14:
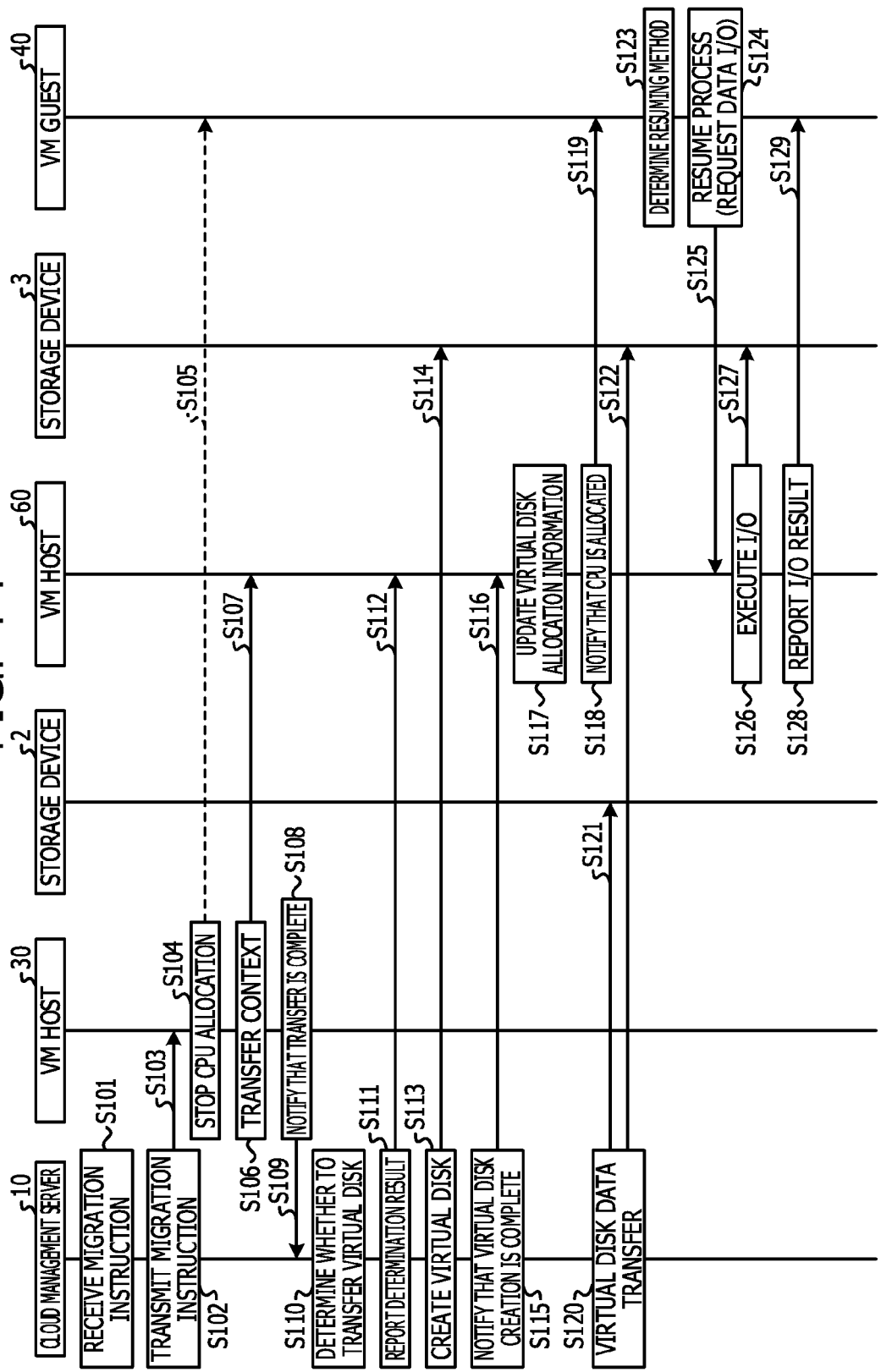
FIG. 14 is a sequence diagram of a process according to a first embodiment.

FIG. 14 is a sequence diagram of a process according to the first embodiment. As illustrated in FIG. 14, the cloud management server 10 receives a migration instruction from an administrator or the like (S101). The cloud management server 10 transmits the migration instruction to the source VM host 30 running the VM guest to be migrated (S102 and S103).

The source VM host 30 stops the allocation of a CPU to the VM guest 40 (S104 and S105). The source VM host 30 transfers execution context, which includes the states of the registers and the memory of the VM guest 40, to the destination VM host 60 (S106 and S107). At this point, since a CPU is not allocated to the VM guest 40, execution of a job running on the VM guest is suspended. After that, the source VM host 30 transmits a notification, to the cloud management server 10, indicating that the transfer of the execution context is complete (S108 and S109).

The cloud management server 10 references information such as the VM guest management table 14, the virtual disk management table 17, and the VM host management table 13, and determines whether or not to transfer the virtual disk (S110). The cloud management server 10 determines that since storage is not shared and data is stored on a virtual disk used by the VM guest 40, the virtual disk is to be transferred, and notifies the destination VM host 60 of the determination result (S111 and S112).

After that, the cloud management server 10 creates a virtual disk in the storage device 3 accessible by the destination VM host 60. The created virtual disk has the same capacity as the virtual disk that has been allocated to the VM guest 40 to be migrated (S113 and S114). After creation is complete, the cloud management server 10 notifies the destination VM host 60 of the completion of the virtual disk creation (S115 and S116).

Next, the destination VM host 60 updates the virtual disk allocation information on the basis of virtual disk allocation information reported by the cloud management server 10 (S117). After that, the destination VM host 60 starts allocation of a CPU to the migrated VM guest 40, and notifies the VM guest 40 of the completion of the CPU allocation (S118 and S119).

The cloud management server 10 retrieves the information stored in the virtual disk allocated to the VM guest from the storage device 2 accessible by the source VM host, and transfers the retrieved information to the storage device 3 (S120 to S122).

The VM guest 40 computes the first time and the second time discussed above, determines a resuming method for the suspended job (S123), and resumes execution of the job in accordance with the determination result. At this point, in the case of determining to resume the suspended job from the suspend point, the VM guest 40 requests input/output (I/O) of relevant data to the destination VM host 60 (S124 and S125). In the case of determining to re-execute the suspended job from the beginning, the VM guest 40 acquires the job from the source VM host 30 and restarts the job.

The destination VM host 60 executes the I/O request, which is received from the VM guest 40, to the storage device 3 (S126 and S127). At this point, if the data to retrieve is not yet transferred from the storage device 2, the destination VM host 60 enters a standby state. After retrieving the data from the storage device 3, the destination VM host 60 transmits the I/O result to the requesting VM guest 40 (S128 and S129).

Figure 15:
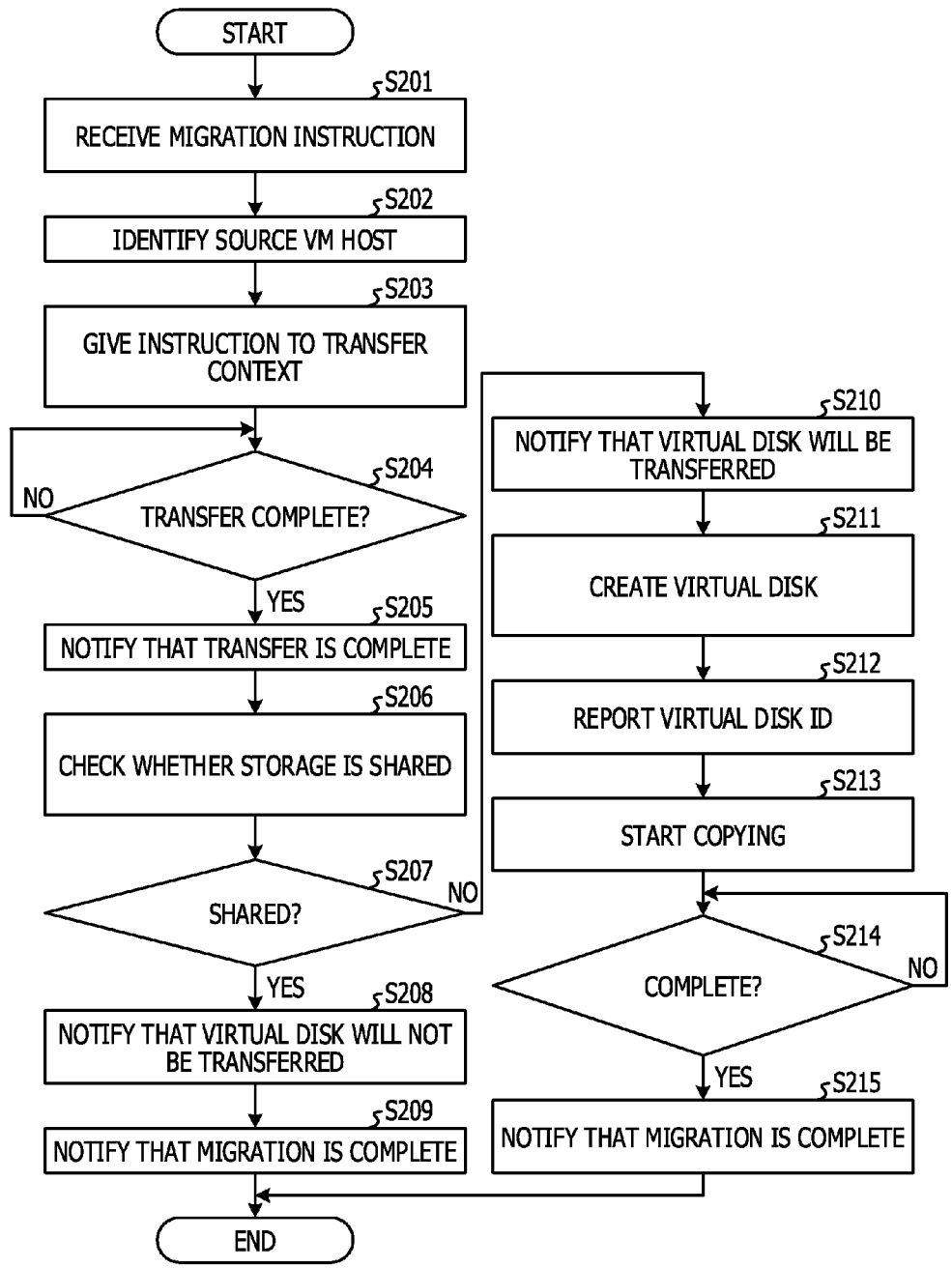
FIG. 15 is a flowchart illustrating a flow of a process executed by a cloud management server according to a first embodiment.

FIG. 15 is a flowchart illustrating a flow of a process executed by a cloud management server according to the first embodiment. As illustrated in FIG. 15, the migration execution unit 22 of the cloud management server 10 receives a migration instruction for the VM guest 40 from an administrator or the like (S201). For example, the migration execution unit 22 receives the ID of the VM guest 40 to be migrated and the ID of the destination VM host 60.

The migration execution unit 22 references the VM guest management table 14, identifies the VM host corresponding to the received ID of the VM guest 40 to be migrated, and sets the identified VM host as the source VM host 30 (S202).

The migration execution unit 22 instructs the source VM host 30 to transfer the execution context of the VM guest 40 to the destination VM host 60 (S203).

After receiving a notification indicating that the transfer of the execution context is complete (S204: Yes), the migration execution unit 22 notifies the administrator or the like of the completion of the transfer of the execution context (S205).

The migration execution unit 22 references information such as the VM guest management table 14, the virtual disk management table 17, and the VM host management table 13, and checks whether or not the source VM host 30 and the destination VM host 60 are sharing storage (S206).

In the case of determining that storage is shared (S207: Yes), the migration execution unit 22 notifies the destination VM host 60 that transfer of a virtual disk will not be conducted (S208). The migration execution unit 22 notifies the administrator or the like that migration is complete (S209).

On the other hand, in the case of determining that storage is not shared (S207: No), the migration execution unit 22 notifies the destination VM host 60 that transfer of a virtual disk will be conducted (S210).

The migration execution unit 22 creates a virtual disk for the VM guest 40 in the storage device 3 accessible by the destination VM host 60 (S211). For example, the migration execution unit 22 creates in the storage device 3 the same number of virtual disks with the same sizes as the number and the sizes of the virtual disks in the storage device 2 that the VM guest 40 using before migrated.

The migration execution unit 22 notifies the destination VM host 60 of the ID of the newly created virtual disk (S212). The migration execution unit 22 retrieves data to be stored on the virtual disk from the storage device 2, and starts a process of copying the retrieved data to the newly created virtual disk in the storage device 3 (S213).

After copying is complete for all virtual disks (S214: Yes), the migration execution unit 22 notifies the administrator or the like that the virtual disk data transfer is complete and that migration is complete (S215).

Figure 16:
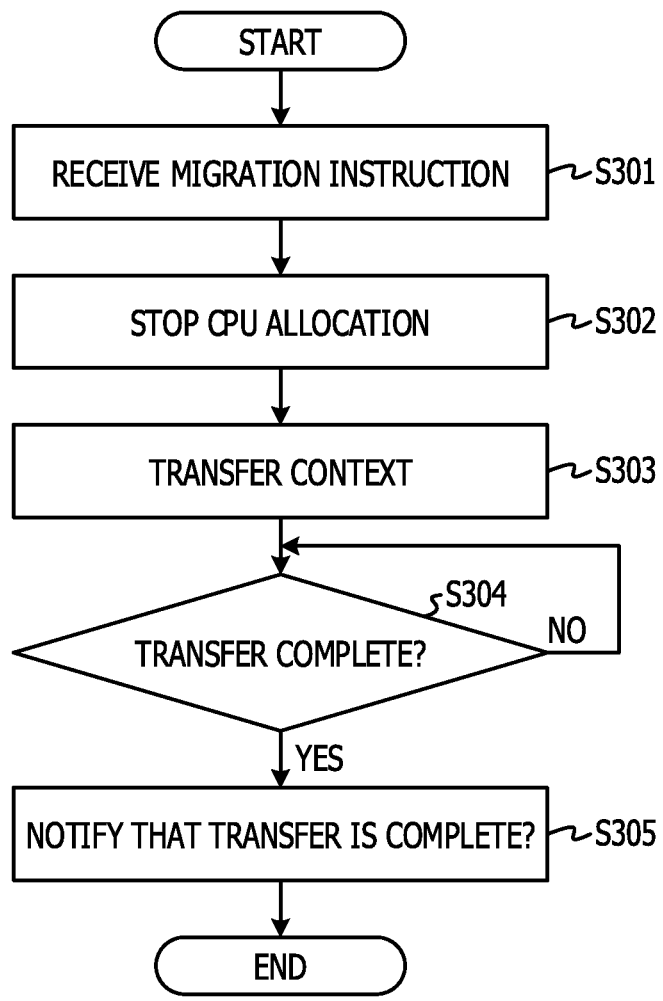
FIG. 16 is a flowchart illustrating a flow of a process executed by a source VM host according to a first embodiment.

FIG. 16 is a flowchart illustrating a flow of a process executed by a source VM host according to the first embodiment. As illustrated in FIG. 16, the resource allocation unit 34 of the source VM host 30 receives a migration instruction for the VM guest 40 running on the source VM host 30 itself (S301). For example, the resource allocation unit 34 receives from the cloud management server 10 the ID of the VM guest 40 to be migrated and the ID of the destination VM host 60.

The resource allocation unit 34 stops the allocation of a CPU to the indicated VM guest 40 to be migrated (S302). The resource allocation unit 34 transfers the execution context of the VM guest 40 to the destination VM host 60 (S303).

After the transfer of the execution context is complete (S304: Yes), the resource allocation unit 34 notifies the cloud management server 10 of the completion of the transfer of the execution context (S305).

Figure 17:
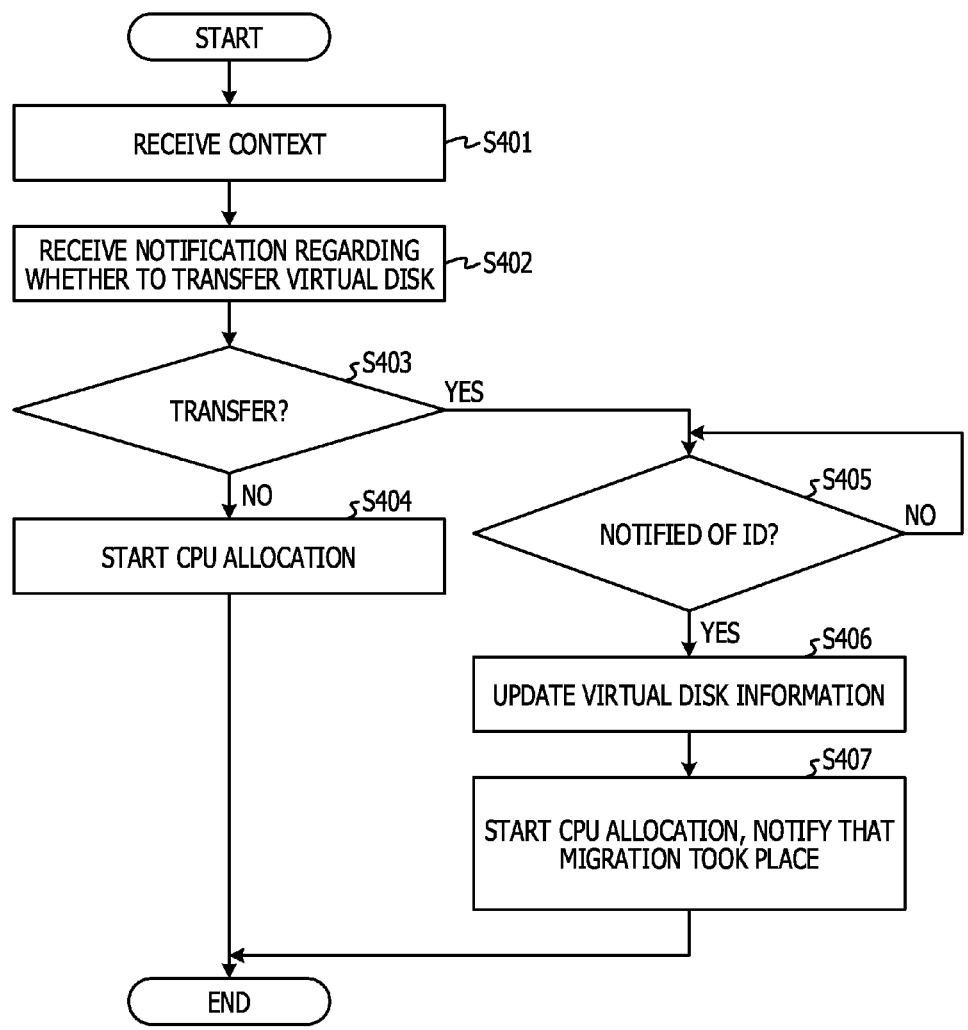
FIG. 17 is a flowchart illustrating a flow of a migration process executed by a destination VM host according to a first embodiment.

FIG. 17 is a flowchart illustrating a flow of a migration process executed by a destination VM host according to the first embodiment.

As illustrated in FIG. 17, the notification unit 65 of the destination VM host 60 receives, from the source VM host 30, the execution context of the VM guest 40 to be migrated (S401). Subsequently, the notification unit 65 receives, from the cloud management server 10, a notification regarding whether or not a virtual disk will be transferred (S402).

In the case in which a virtual disk will not be transferred (S403: No), the resource allocation unit 64 starts the allocation of a CPU to the VM guest 40 (S404). At this point, the VM guest is not notified of the migration.

On the other hand, in the case in which a virtual disk will be transferred (S403: Yes), the resource allocation unit 64 determines whether or not the ID of a newly created virtual disk is reported from the cloud management server 10 (S405).

When the ID of the newly created virtual disk is reported from the cloud management server 10 (S405: Yes), the resource allocation unit 64 updates the information about a virtual disk allocated to the VM guest 40 (S406). In addition, the resource allocation unit 64 transmits information to the cloud management server 10, causing the cloud management server 10 to update various tables.

After that, the resource allocation unit 64 starts the allocation of a CPU to the VM guest 40, and the notification unit 65 notifies the VM guest 40 of the migration (S407).

Figure 18:
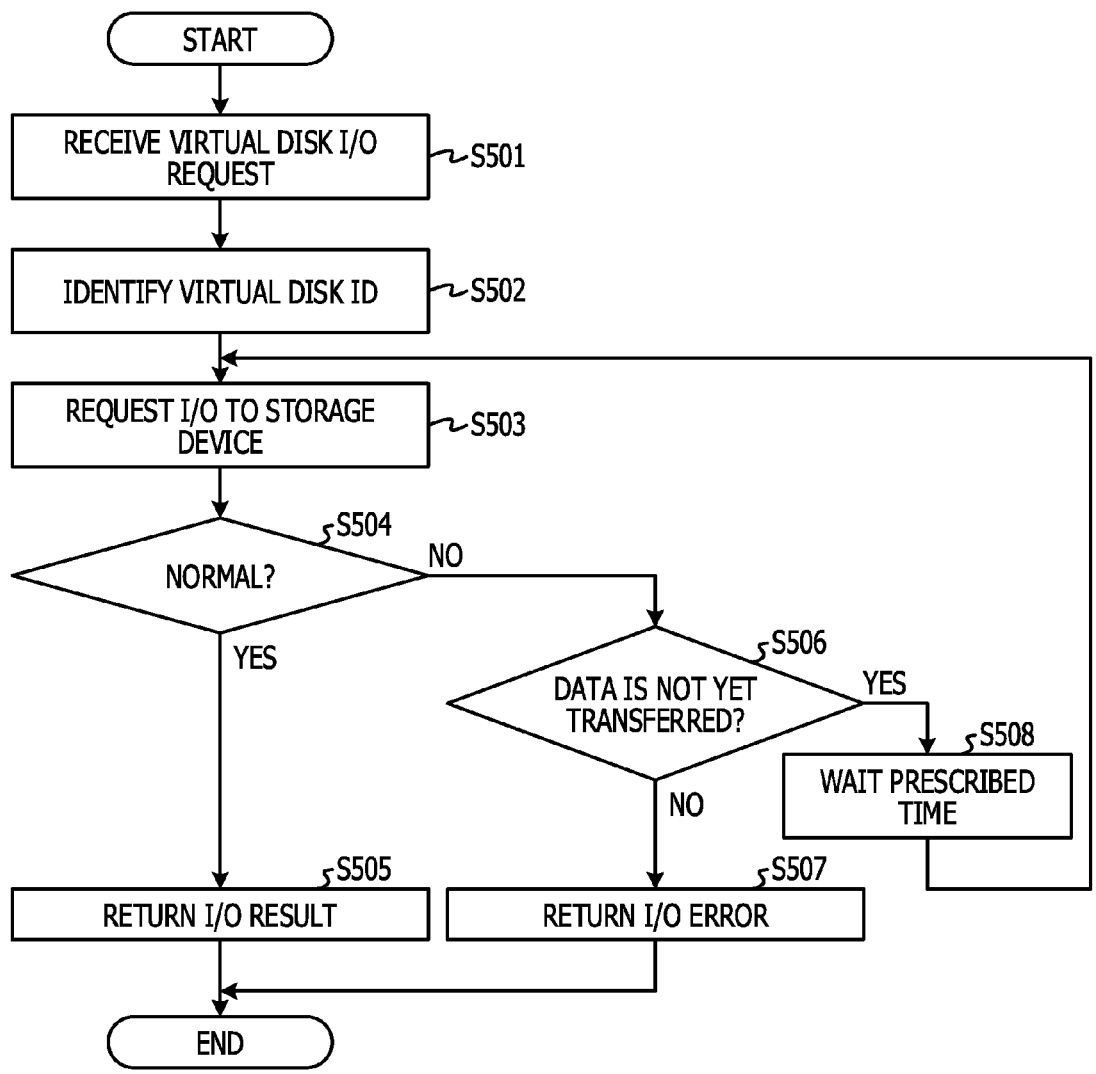
FIG. 18 is a flowchart illustrating a flow of an I/O request process executed by a destination VM host according to a first embodiment.

FIG. 18 is a flowchart illustrating a flow of an I/O request process executed by a destination VM host according to the first embodiment. As illustrated in FIG. 18, the notification unit 65 of the destination VM host 60 receives an I/O request for a virtual disk from the migrated VM guest 40 (S501).

The control unit 63 of the destination VM host 60 references the VM guest management table 14 of the cloud management server 10, and identifies the ID of a virtual disk in the storage device 3 (S502). The control unit 63 of the destination VM host 60 transmits an I/O request specifying the virtual disk ID and the like to the storage device 3 (S503).

If the I/O is processed normally (S504: Yes), the control unit 63 of the destination VM host 60 responds to the VM guest 40 with an I/O result (S505).

If the I/O is not processed normally (S504: No), the control unit 63 of the destination VM host 60 determines whether or not a retrieval failure has occurred because of not yet transferred data (S506). In other words, the VM host 60 determines whether or not an error has occurred because the data to be retrieved has not yet been transferred from the source storage device 2 to the destination storage device 3.

If the error is an ordinary read error or the like, and not a retrieval failure due to not yet transferred data (S506: No), the control unit 63 of the destination VM host 60 responds to the VM guest 40 with an I/O error (S507).

In the case of a retrieval failure due to not yet transferred data (S506: Yes), the control unit 63 of the destination VM host 60 executes S503 again after waiting for a prescribed time, such as 5 seconds, for example (S508).

Figure 19:
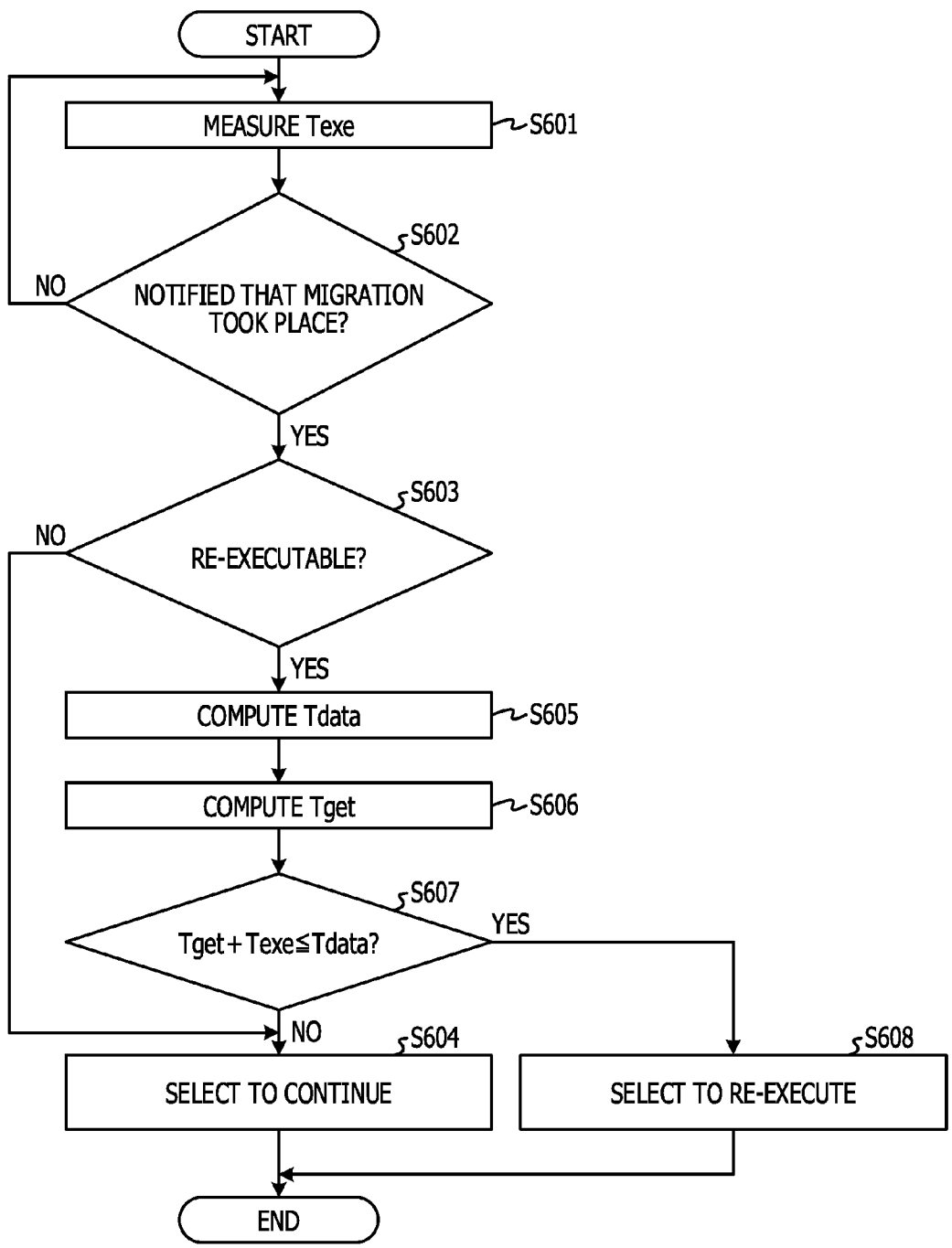
FIG. 19 is a flowchart illustrating a flow of a process executed by a VM guest to be migrated according to a first embodiment.

FIG. 19 is a flowchart illustrating a flow of a process executed by a VM guest to be migrated according to the first embodiment. As illustrated in FIG. 19, the application execution unit 45 of the VM guest 40 executes an application process, measures the run-time, that is, the CPU time, and records the run-time in a virtual memory or the like (S601). Take "Texe" to be the time recorded at this point.

After the notification reception unit 46 of the VM guest 40 receives a notification of migration from the destination VM host 60 (S602: Yes), the determination unit 49 determines whether or not the application process in execution has a property of "Re-executable" (S603). Specifically, the determination unit 49 makes the determination by referencing the application properties table 43.

For example, in the case of an application process of a batch job, the job may be restarted from the beginning while discarding the execution result partway through the job. In the case of an application process that saves a partial result at a checkpoint, it is possible to restart from the checkpoint. The application process developer sets whether or not an application process has a property of "Re-executable" as property information.

If the application process in execution does not have a property of "Re-executable" (S603: No), the determination unit 49 selects a resuming method that continues the process in execution (S604). In other words, the application execution unit 45 resumes, from the suspend point, the process in execution that is suspended due to the migration.

If the application process in execution has a property of "Re-executable" (S603: Yes), the first time computation unit 47 computes "Tdata" discussed above (S605). Specifically, the first time computation unit 47 computes "Tdata" by querying the cloud management server 10 via the destination VM host 60 for the transfer rate of the virtual disk.

Next, the second time computation unit 48 computes "Tget" discussed above (S606). Specifically, if the application process is a batch job, the second time computation unit 48 computes the time taken to reacquire the job. If the application process saves a partial result at a checkpoint, the second time computation unit 48 computes the time taken to acquire the saved partial result.

After that, if "Tget+Texe>Tdata" rather than "Tget+Texe≤Tdata" (S607: No), the determination unit 49 selects a resuming method that continues the process in execution (S604).

If "Tget+Texe≤Tdata" (S607: Yes), the determination unit 49 selects a resuming method that discards the currently executed process and re-executes the process from a rewind point (S608). For example, in the case of an application process of a batch job, the application execution unit 45 restarts the process from the beginning. In the case of an application process that saves a partial result at a checkpoint, the application execution unit 45 re-executes the process from the checkpoint.

Next, an example of migrating a VM guest "Guest_02" to a VM host "Host_102" will be described. Herein, suppose that the VM guest "Guest_02" is executing APP-A.

The cloud management server 10 identifies, based on the VM guest management table 14, that the VM guest "Guest_02" is running on the VM host "Host_002". The cloud management server 10 identifies, based on the VM guest management table 14, that a virtual disk "VDISK_030" is allocated to the VM guest "Guest_02". The cloud management server 10 identifies, based on the virtual disk management table 17, that the size of the virtual disk "VDISK_030" is "10 GB".

The cloud management server 10 identifies, based on the virtual disk management table 17, that the virtual disk "VDISK_030" is carved out from a virtual storage "VS_001". The cloud management server 10 identifies, based on the VM host management table 13, that the VM host "Host_102" is unable to access the virtual storage "VS_001".

The cloud management server 10 identifies, based on the VM host management table 13, that the VM host "Host_102" is able to access the virtual storage "VS_101". For this reason, the cloud management server 10 determines to transfer the contents of the virtual disk "VDISK_030" to a new virtual disk carved out from the virtual storage "VS_101".

In addition, the cloud management server 10 identifies, based on the VM host management table 13, that the source VM host "Host_002" is in a pod "A", and that the destination VM host "Host_102" is in a pod "B". The cloud management server 10 identifies, based on the bandwidth management table 18, that the network bandwidth between pods "A" and "B" is "200 Mbps".

The VM guest "Guest_02" references the application process properties table 43, and identifies that the input data size of the suspended APP-A is "1024.1 MB". The VM guest "Guest_02" identifies, based on information such as the bandwidth management table 18 of the cloud management server 10, that the network bandwidth usable for communication with the job pool of batch jobs is "100 Mbps".

Note that the job pool of batch jobs is a location where unexecuted jobs are placed. For example, in a master/worker system, the master server holds the job pool, and thus the bandwidth between the master server and the destination VM host is used. For a typical system, the bandwidth between the source VM host and the destination VM host is used.

Using such information, the VM guest "Guest_02" computes the time "Tget" taken to reacquire the job from the job pool as "1024.1 MB/100 Mbps≈82 s" (approximately 1.4 minutes). In addition, the VM guest "Guest_02" computes the time "Tdata" taken to transfer the virtual disk "VDISK_030" as "10 GB/200 Mbps≈410 s" (approximately 7 minutes).

First Example

Suppose that the VM guest "Guest_02" starts a job, and then receives a notification of a migration when the CPU time (processing time) reaches 5 minutes. Since "Tdata=7 min", continuing the job directly from the suspend point would mean that the VM guest "Guest_02" waits 7 minutes until the transfer of the contents of the virtual disk is complete.

Meanwhile, re-executing the job from the beginning would mean that the VM guest "Guest_02" takes "1.4 min" to re-acquire the job from the job pool, and "5 min" to re-execute the job from the beginning up to the suspend point. In other words, "Tget+Texe=1.4+5=6.4 min".

From these results, "Tget+Texe≤Tdata", and thus the VM guest "Guest_02" selects a method that does not wait for the transfer of the contents of the virtual disk to complete, but instead re-acquires the job, and restarts the job from the beginning.

Second Example

Suppose that the VM guest "Guest_02" starts a job, and then receives a notification of a migration when the CPU time (processing time) reaches 10 minutes. Since "Tdata=7 min", continuing the job directly from the suspend point would mean that the VM guest "Guest_02" will wait 7 minutes until the transfer of the contents of the virtual disk is complete.

Meanwhile, re-executing the job from the beginning would mean that the VM guest "Guest_02" takes "1.4 min" to re-acquire the job from the job pool, and "10 min" to re-execute the job from the beginning up to the suspend point. In other words, "Tget+Texe=1.4+10=11.4 min".

From these results, "Tget+Texe>Tdata", and thus the VM guest "Guest_02" selects a method that waits for the data transfer to complete, and resumes from the suspend point.

In this way, the VM guest is able to compute the time to transfer partial data and resume a process suspended by migration, and the time taken to restart the process from the beginning and reach the suspend point on the migration destination, and select the shorter time. In other words, when resuming a process that was suspended during migration at the migration destination, the VM guest calculates the time taken until resuming the unexecuted part. The VM guest may then execute the suspended process by the method that enables earlier resuming.

Since the VM guest may resume a process earlier, the time taken to process the overall application process may also be shortened. Since the VM guest itself that executes the process determines the resuming method by which to resume the process, the time taken to determine a method may also be shortened compared to the case of a third parry such as a VM host determining a method.

Second Embodiment

The first embodiment describes an example in which the VM guest determines a resuming method and the like after the migration destination VM host notifies the migrated VM guest that migration is complete. However, the configuration is not limited thereto. For example, the migration source VM host may notify the migrated VM guest that a migration will be initiated.

Accordingly, second embodiment describes an example in which the migration source VM host notifies the migrated VM guest that a migration will be initiated, and the VM guest determines a resuming method and the like. Note that the process executed by the destination VM host is similar to the first embodiment, and thus a detailed description will be reduced or omitted.

Figure 20:
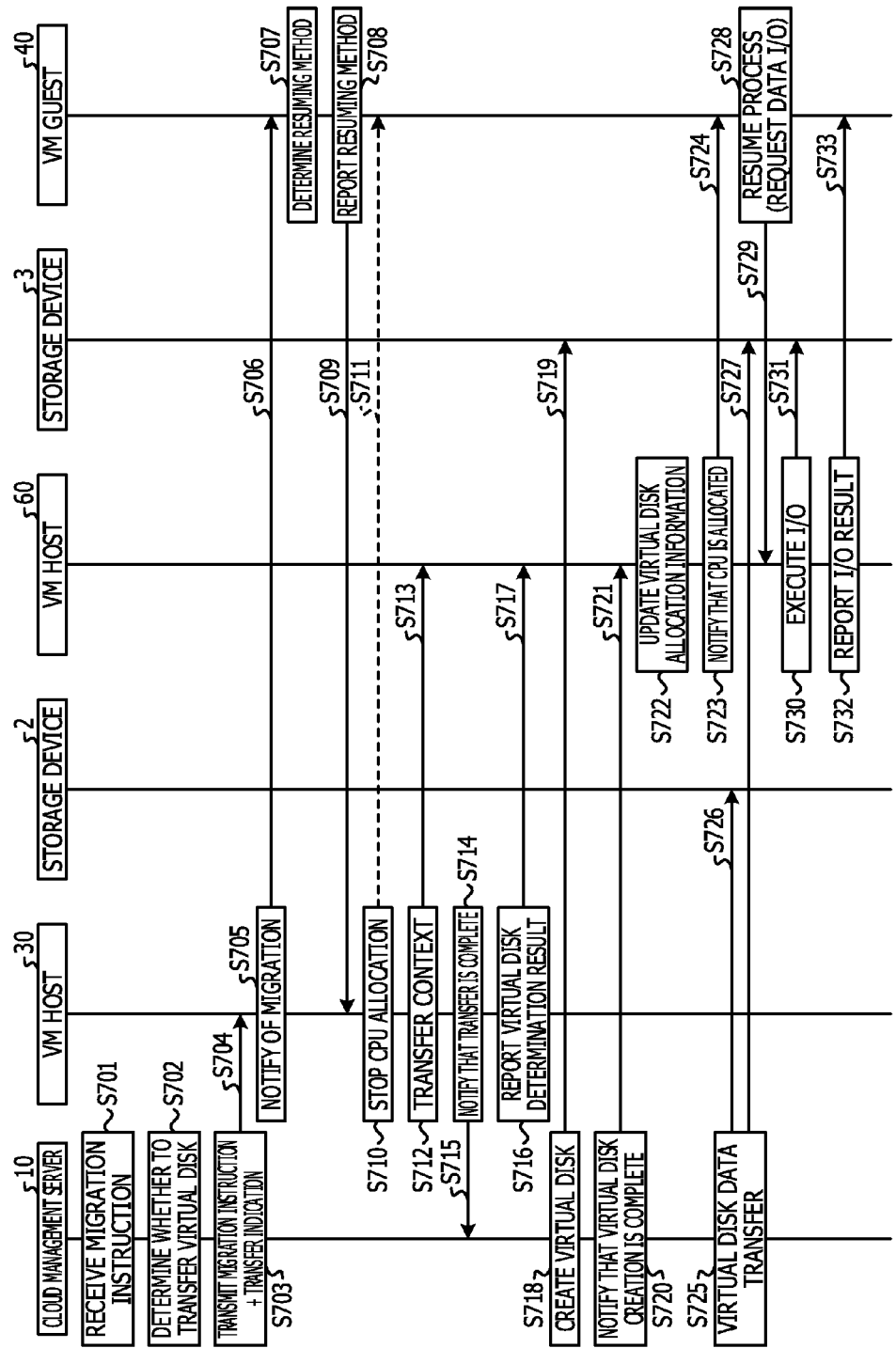
FIG. 20 is a sequence diagram of a process according to a second embodiment.

FIG. 20 is a sequence diagram of a process according to the second embodiment. As illustrated in FIG. 20, the cloud management server 10 receives a migration instruction from an administrator or the like (S701). The cloud management server 10 determines whether or not to transfer a virtual disk used by the VM guest to be migrated (S702). Next, the cloud management server 10 transmits an indication of whether or not to transfer a virtual disk and a migration instruction to the source VM host 30 (S703 and S704).

The source VM host 30 notifies the VM guest 40 to be migrated that migration will be executed (S705 and S706). After receiving this notification, the VM guest 40 computes the first time and the second time discussed above, determines a resuming method for the job to be suspended (S707), and notifies the source VM host 30 of the determination result (S708 and S709).

The source VM host 30 stops the allocation of a CPU to the VM guest 40 (S710 and S711). The source VM host 30 transfers execution context, which includes the states of the registers and the memory of the VM guest 40, to the destination VM host 60 (S712 and S713). At this point, since a CPU is not allocated to the VM guest 40, execution of the job running on the VM guest is suspended.

After that, the source VM host 30 transmits, to the cloud management server 10, a notification indicating that the transfer of the execution context is complete (S714 and S715). Also, the source VM host 30 notifies the destination VM host 60 of the determination result regarding whether or not to transfer a virtual disk (S716 and S717).

The virtual disk creation, CPU allocation, and I/O process subsequently executed from S718 to S733 are similar processes to S113 to S122 and S124 to S129 described in the first embodiment, and thus a detailed description will be reduced or omitted.

Figure 21:
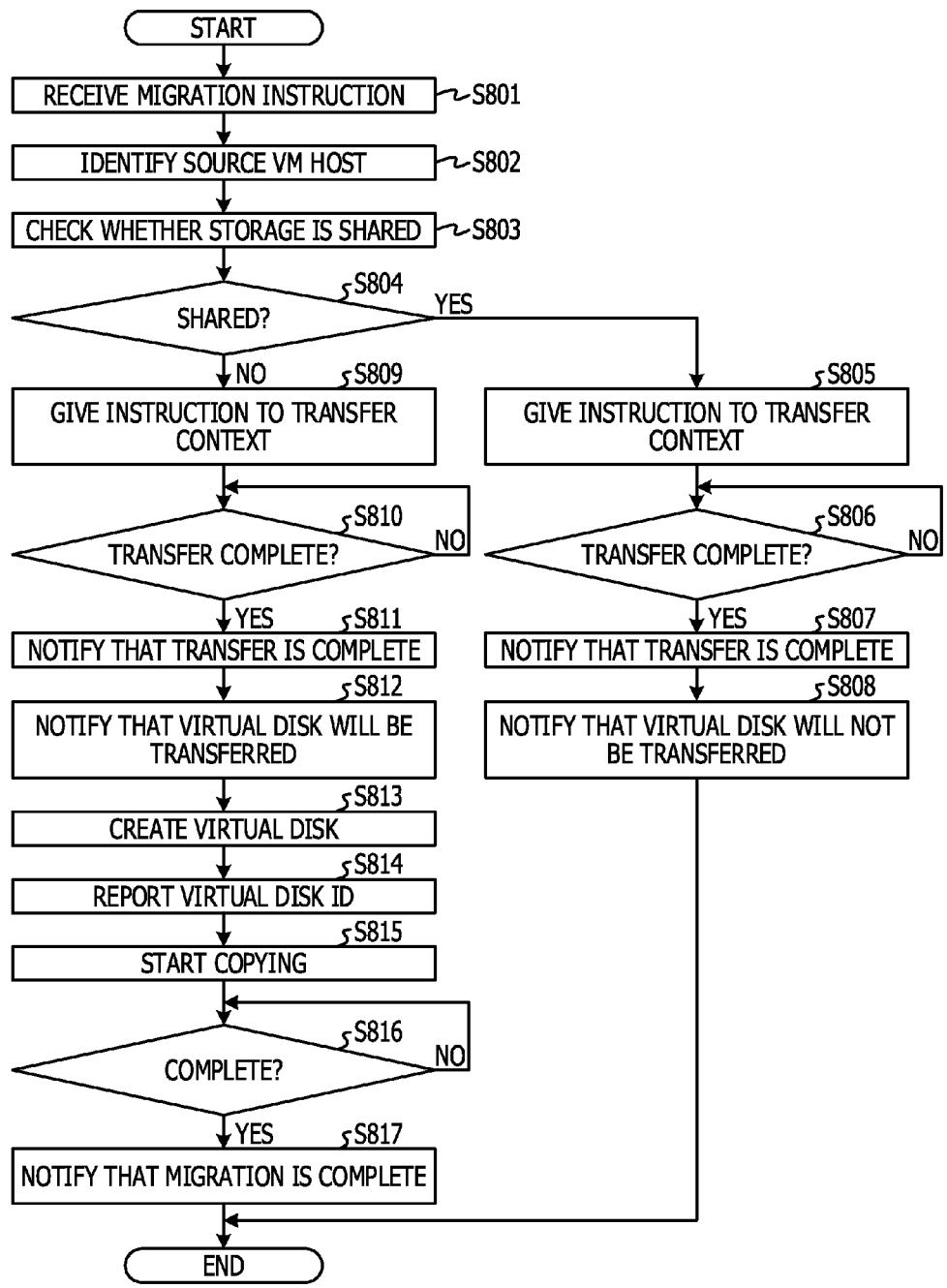
FIG. 21 is a flowchart illustrating a flow of a process executed by a cloud management server according to a second embodiment.

FIG. 21 is a flowchart illustrating a flow of a process executed by a cloud management server according to the second embodiment. As illustrated in FIG. 21, the migration execution unit 22 of the cloud management server 10 receives a migration instruction for the VM guest 40 from an administrator or the like (S801).

Next, the migration execution unit 22 references the VM guest management table 14 and the like, identifies the VM host corresponding to the received ID of the VM guest to be migrated, and sets the identified VM host as the source VM host 30 (S802).

The migration execution unit 22 references the VM host management table 13 and the physical storage management table 15 and the like, and checks whether or not the source VM host 30 and the destination VM host 60 are sharing storage (S803).

In the case of determining that storage is shared (S804: Yes), the migration execution unit 22 instructs the source VM host 30 to transfer the execution context of the VM guest 40 to the destination VM host 60 (S805). At this point, the migration execution unit 22 also notifies the source VM host 30 that the transfer of a virtual disk will not be conducted.

After receiving a notification indicating that the transfer of the execution context is complete (S806: Yes), the migration execution unit 22 notifies the administrator or the like of the completion of the transfer of the execution context (S807). The migration execution unit 22 also notifies the destination VM host 60 that the transfer of a virtual disk will not be conducted (S808), and ends the process.

In the case of determining that storage is not shared (S804: No), the migration execution unit 22 instructs the source VM host 30 to transfer the execution context of the VM guest 40 to the destination VM host 60 (S809). At this point, the migration execution unit 22 also notifies the source VM host 30 that the transfer of a virtual disk will be conducted.

After receiving a notification indicating that the transfer of the execution context is complete (S810: Yes), the migration execution unit 22 notifies the administrator or the like of the completion of the transfer of the execution context (S811). The migration execution unit 22 also notifies the destination VM host 60 that the transfer of a virtual disk will be conducted (S812).

The processes such as virtual disk creation subsequently executed from S813 to S817 are similar to processes from S211 to S215 described in the first embodiment, and thus a detailed description will be reduced or omitted.

Figure 22:
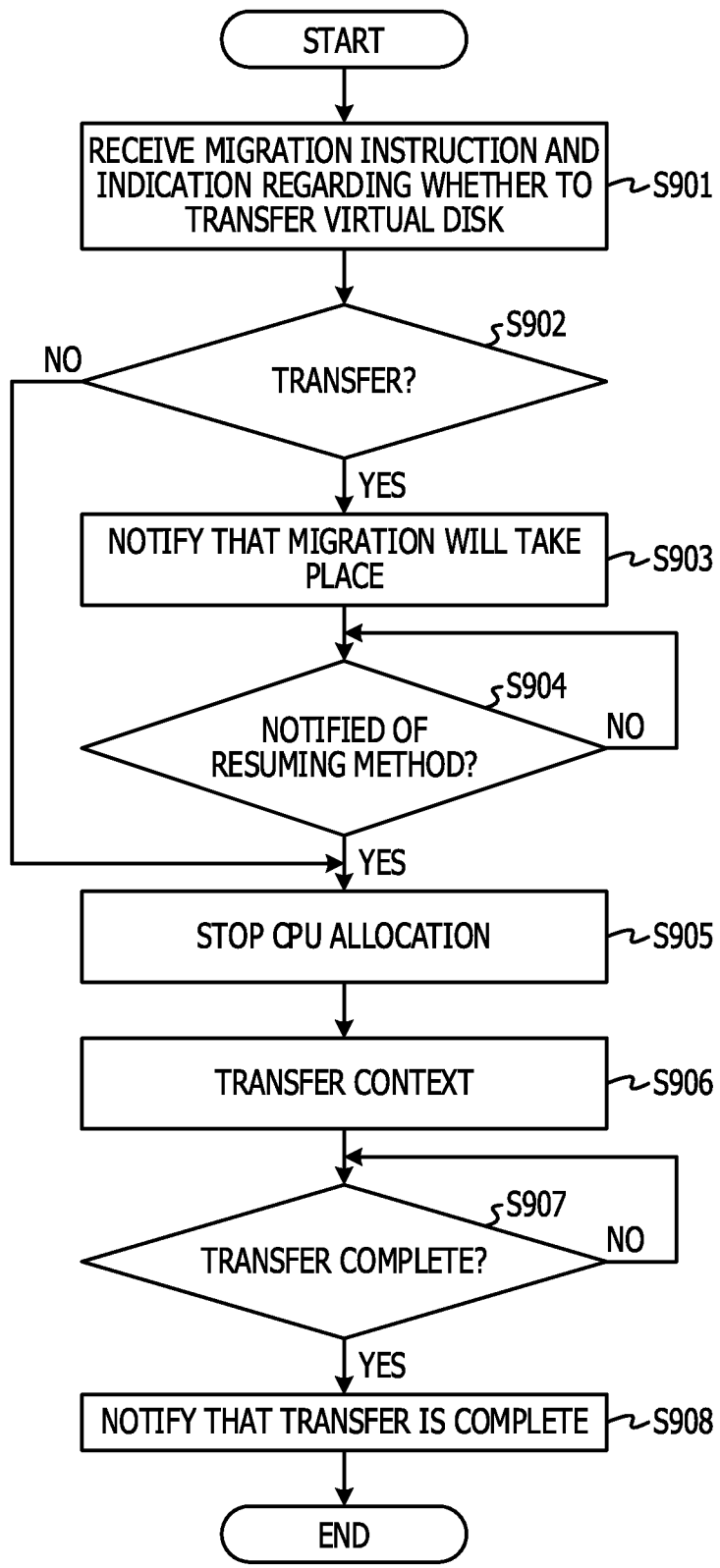
FIG. 22 is a flowchart illustrating a flow of a process executed by a source VM host according to a second embodiment.

FIG. 22 is a flowchart illustrating a flow of a process executed by a source VM host according to the second embodiment.

As illustrated in FIG. 22, the notification unit 35 of the source VM host 30 receives from the cloud management server 10 a migration instruction for the VM guest 40 and an indication regarding whether or not to transfer a virtual disk (S901).

In the case in which a virtual disk will be transferred (S902: Yes), the resource allocation unit 34 notifies the VM guest 40 of the migration (S903), and the resource allocation unit 34 determines whether or not a notification regarding the determination of a resuming method has been received from the VM guest 40 (S904). In the case in which a virtual disk will not be transferred (S902: No), the resource allocation unit 34 executes S905 without executing S903 and S904.

After the resource allocation unit 34 receives, from the VM guest 40, a notification indicating that a resuming method has been determined (S904: Yes), the resource allocation unit 34 stops the allocation of a CPU to the VM guest 40 (S905). At this point, the VM guest 40 is not notified of the migration.

The subsequent processes from S906 to S908 are similar to processes from S303 to S305 described in the first embodiment, and thus a detailed description will be reduced or omitted.

Figure 23:
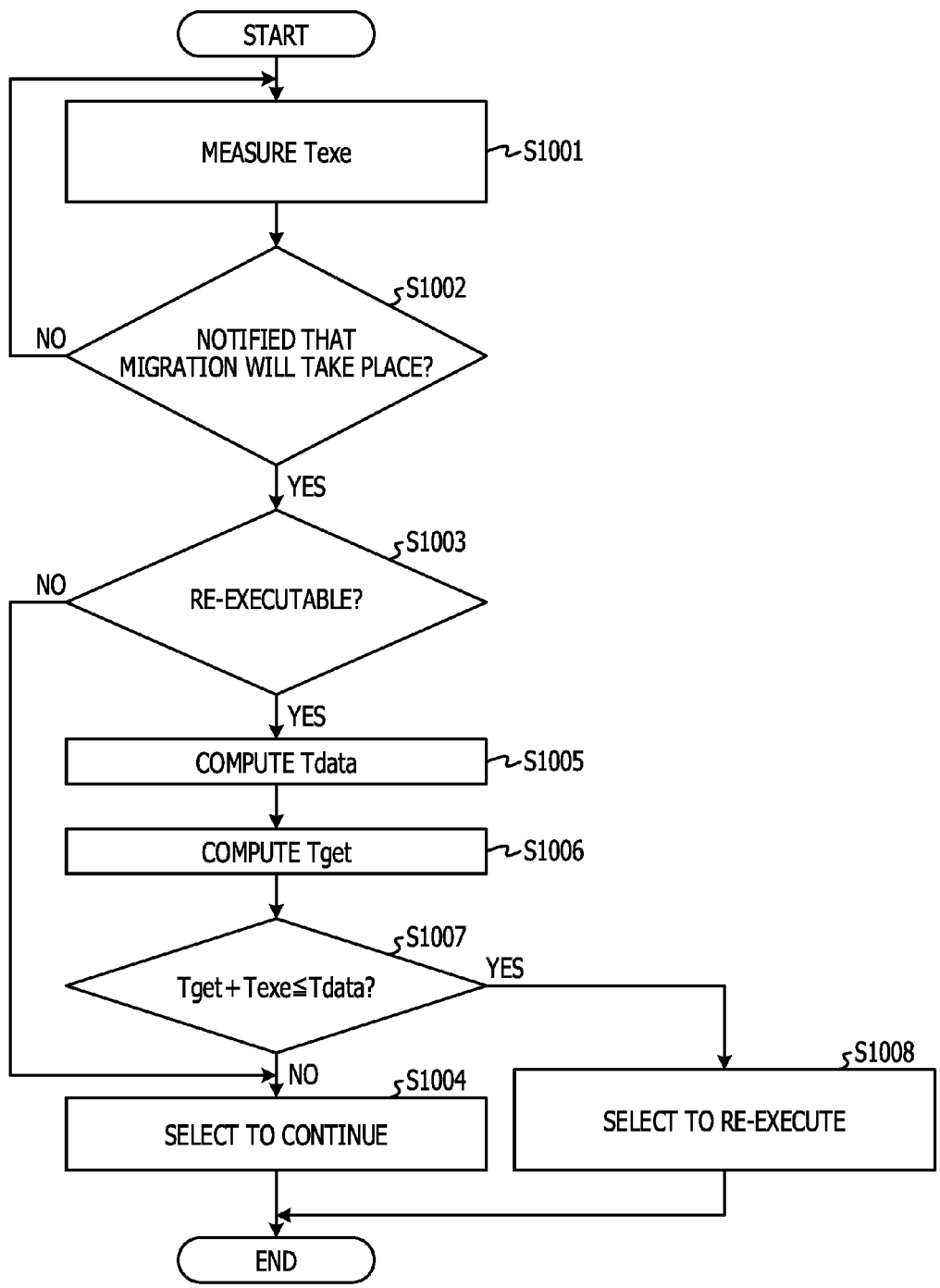
FIG. 23 is a flowchart illustrating a flow of a process executed by a VM guest to be migrated according to a second embodiment.

FIG. 23 is a flowchart illustrating a flow of a process executed by a VM guest to be migrated according to the second embodiment. As illustrated in FIG. 23, the application execution unit 45 of the VM guest 40 executes an application process, measures the run-time, that is, the CPU time, and records the run-time in a virtual memory or the like (S1001). Take "Texe" to be the time recorded at this point.

After the notification reception unit 46 of the VM guest 40 receives a notification of migration from the source VM host 30 (S1002: Yes), the determination unit 49 determines whether or not the application process in execution has a property of "Re-executable" (S1003).

The subsequent processes from S1004 to S1008 are similar to processes from S604 to S608 described in the first embodiment, and thus a detailed description will be reduced or omitted.

In this way, a VM guest 40 according to the second embodiment receives a notification from the source VM host 30 before migration, and is able to determine a resuming method. Consequently, the VM guest 40 is able to execute job resuming immediately after migration is complete. As a result, compared to the first embodiment, a shortening of overall application processing time may be anticipated.

Other Embodiments

The embodiments described above may be carried out in various different forms other than the embodiments discussed above. Accordingly, different embodiments will be described below.

The foregoing first and second embodiments describe an example in which the source VM host and the destination VM host do not share storage, but the configuration is not limited thereto. For example, if the source VM host and the destination VM host share storage, the VM guest may select a method that resumes from the suspend point. Note, however, that selecting a migration destination under the condition that storage is shared may possibly limit the migration destinations.

The first and second embodiments describe an example of transferring information about a virtual disk at the source to the destination, irrespective of which resuming method the VM guest determines to use. However, the configuration is not limited thereto. For example, if a virtual disk is being copied at the timing when the VM guest determines to restart from the beginning, the copy may be aborted. Also, it may also be configured so that virtual disk copying is not executed if the VM guest determines to restart from the beginning before being migrated. With this, unwanted processing may be minimized, thereby reducing the CPU load on the VM guest, and also leading to a shortening of the run-time of the job to resume. Moreover, wasteful usage of network bandwidth may be minimized.

For example, if it is possible to identify information indicating which portion of a virtual disk contains data or a file used in order to directly continue a process on the VM guest from the suspend point, the resuming method determination may be carried out more precisely. For example, suppose that the data transfer of the contents of a virtual disk is carried out from the beginning of the virtual disk, and that the data or file is near the beginning of the virtual disk. In this case, waiting for the data to be transferred may sometimes become more advantageous than restarting the process from the beginning. In other words, in such cases, a method that waits for the data transfer and restarts from the suspend point is implemented, even if the VM guest has determined to use a method that restarts from the beginning.

It is also possible to manually conduct all or part of the processes described in the embodiments as being conducted automatically. Alternatively, it is also possible to automatically conduct, with established methods, all or part of the processes described in the embodiments as being conducted manually. Besides the above, information may be arbitrarily modified unless specifically noted otherwise, such information including the processing procedures, control procedures, specific names, and various data or parameters indicated in the above document or in the drawings.

The respective structural elements of the respective devices illustrated in the drawings are functional and conceptual illustrations, and are not limited to being physically configured exactly as depicted in the drawings. In other words, the specific configuration in which the respective devices are separated or joined is not limited to that illustrated in the drawings, and all or part thereof may be functionally or physically separated or joined in arbitrary units according to factors such as various loads and usage conditions. All or an arbitrary part of the respective processing functions conducted by the respective devices may be realized by a CPU executing a program, or alternatively, realized as hardware by wired logic.

Figure 24:
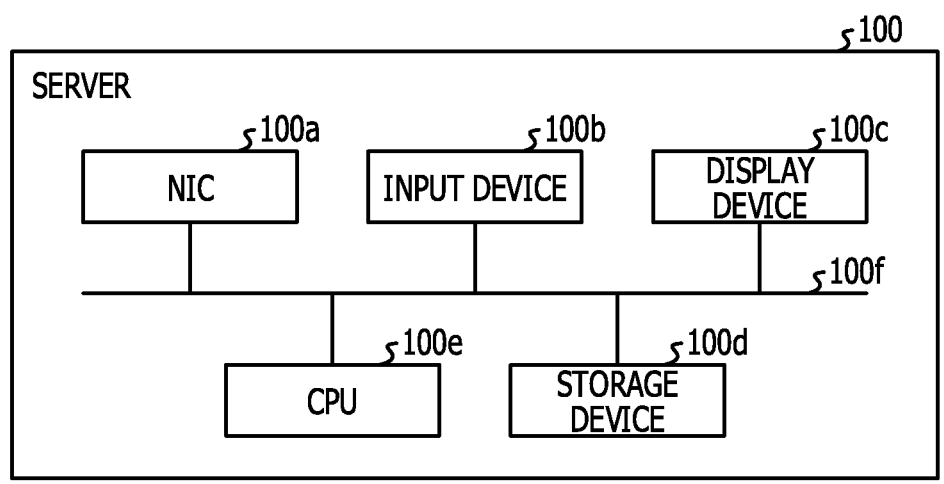
FIG. 24 is a diagram illustrating an exemplary hardware configuration.

Next, an exemplary hardware configuration of a VM host and cloud management server will be described. Since each server has a similar configuration, a single example will be described herein. FIG. 24 is a diagram illustrating an exemplary hardware configuration. As illustrated in FIG. 24, a server 100 includes a network interface card (NIC) 100*a*, an input device 100*b*, a display device 100*c*, a storage device 100*d*, and a CPU 100*e*. These components are connected with one another via a bus 100*f*.

The NIC 100*a* is a communication interface, and controls communication with other devices. The input device 100*b* is a mouse or keyboard, for example, and receives operations by an administrator or the like. The display device 100*c* is a display or touch panel, for example, and display various information.

The storage device 100*d* is a memory or a hard disk drive, for example, and stores therein programs executed by the CPU 100*e*, and various data. For example, the storage device 100*d* stores therein the respective tables illustrated in FIG. 2.

The CPU 100*e* is a processing unit that controls the overall server device, retrieving various programs and executing processes. For example, the CPU 100*e* executes processes that realize similar functionality as the respective processing units described with reference to FIG. 2. The CPU 100*e* executes processes that realize similar functionality as the respective processing units described with reference to FIGS. 10 and 11.

In this way, the server 100 retrieves and executes a program to thereby operate as an information processing device that executes a method for resuming a process. The server 100 may also retrieve the above program from a recording medium using a medium reading device, and execute the above program to thereby realize similar functionality as the embodiments discussed above. Note that the programs are not limited to be executed by the server 100. For example, the embodiments discussed herein may be similarly applied even in the case in which another computer or server executes a program, or operate in a coordinated manner to execute a program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for resuming a process, the method comprising:
   notifying, by a first computer, a second computer different from the first computer that first data is to be transferred from the second computer to the first computer;
   initiating the transfer of the first data from the second computer to the first computer;
   computing, by one of the first computer and the second computer, a first time taken to transfer the first data from the second computer to the first computer, the first data being stored by an application process before the application process is suspended, the application process being executed and suspended by the second computer after the first data is transferred to the first computer and to be executed by the first computer after the first data is transferred to the first computer;
   computing a second time by adding together a transfer time and an elapsed execution time, the transfer time being a time taken to transfer second data from a storage area in which the second data is stored to the first computer, the second data being used to execute the application process from beginning of the application process, the elapsed execution time being a time taken to execute the application process from the beginning up to a suspend point at which the application process is suspended;
   determining, when the first time is shorter than the second time, to resume the application process on the first computer from the suspend point; and
   determining, when the second time is shorter than the first time, to re-execute the application process on the first computer from the beginning.

2. The method according to claim 1, further comprising:
   determining, even when the second time is shorter than the first time, to resume the application process on the first computer from the suspend point when the application process is unable to be re-executed from the beginning.

3. The method according to claim 1, further comprising:
   determining, even when the second time is shorter than the first time, to resume the application process on the first computer from the suspend point when the first computer and the second computer are sharing a storage device.

4. The method according to claim 1, wherein
   the second computer computes the first time when the first time is computed before the application process is suspended, and
   the first computer computes the first time when the first time is computed after the application process is suspended.

5. A non-transitory computer-readable recording medium having stored therein a program for one of a first computer and a second computer different from the first computer to execute a process, the process comprising:
   notifying, by the first computer, the second computer that first data is to be transferred from the second computer to the first computer;
   initiating the transfer of the first data from the second computer to the first computer;
   computing a first time taken to transfer the first data from the second computer to the first computer, the first data being stored by an application process before the application process is suspended, the application process being executed and suspended by the second computer after the first data is transferred to the first computer and to be executed by the first computer after the first data is transferred to the first computer;
   computing a second time by adding together a transfer time and an elapsed execution time, the transfer time being a time taken to transfer second data from a storage area in which the second data is stored to the first computer, the second data being used to execute the application process from beginning of the application process, the elapsed execution time being a time taken to execute the application process from the beginning up to a suspend point at which the application process is suspended;
   determining, when the first time is shorter than the second time, to resume the application process on the first computer from the suspend point; and
   determining, when the second time is shorter than the first time, to re-execute the application process on the first computer from the beginning.

6. An information processing system, comprising:
   a first computer; and
   a second computer different from the first computer,
   wherein one of the first computer and the second computer includes a processor configured to:
      notify, by the first computer, the second computer that first data is to be transferred from the second computer to the first computer;
      initiate the transfer of the first data from the second computer to the first computer;
      compute a first time taken to transfer first data from the second computer to the first computer, the first data being stored by an application process before the application process is suspended, the application process being executed and suspended by the second computer after the first data is transferred to the first computer and to be executed by the first computer after the first data is transferred to the first computer,
      compute a second time by adding together a transfer time and an elapsed execution time, the transfer time being a time taken to transfer second data from a storage area in which the second data is stored to the first computer, the second data being used to execute the application process from beginning of the application process, the elapsed execution time being a time taken to execute the application process from the beginning up to a suspend point at which the application process is suspended,
      determine, when the first time is shorter than the second time, to resume the application process on the first computer from the suspend point, and
      determine, when the second time is shorter than the first time, to re-execute the application process on the first computer from the beginning.

* * * * *